US006718960B2

United States Patent
Someno et al.

(10) Patent No.: US 6,718,960 B2
(45) Date of Patent: Apr. 13, 2004

(54) DIAGNOSTIC APPARATUS FOR GAS MIXTURE SUPPLY APPARATUS AND DIAGNOSTIC METHOD THEREOF

(75) Inventors: Tadashi Someno, Hitachinaka (JP); Kiyoshi Amou, Chiyoda (JP); Takanobu Ichihara, Hitachinaka (JP)

(73) Assignees: Hitachi, Ltd., Tokyo (JP); Hitachi Car Engineering Co., Ltd., Ibaraka (JP)

( * ) Notice: Subject to any disclaimer, the term of this patent is extended or adjusted under 35 U.S.C. 154(b) by 0 days.

(21) Appl. No.: 10/231,153

(22) Filed: Aug. 30, 2002

(65) Prior Publication Data

US 2004/0040550 A1 Mar. 4, 2004

(30) Foreign Application Priority Data

Aug. 30, 2001 (JP) ........................................ 2001-261277

(51) Int. Cl.[7] .............................................. F02D 41/00
(52) U.S. Cl. ........................ 123/704; 123/549; 123/478; 123/590
(58) Field of Search ................................ 123/480, 491, 123/490, 543, 478, 547, 545, 557, 704; 701/113

(56) References Cited

U.S. PATENT DOCUMENTS

| 5,894,832 | A | 4/1999 | Nogi et al. | ........... | 123/491 |
| 6,543,412 | B2 * | 4/2003 | Amou et al. | ........... | 123/337 |
| 6,557,521 | B2 * | 5/2003 | Ichihara et al. | ........... | 123/229 |
| 2001/0039936 | A1 * | 11/2001 | Ichihara et al. | ........... | 123/299 |
| 2002/0088433 | A1 * | 7/2002 | Nagano et al. | ........... | 123/431 |

FOREIGN PATENT DOCUMENTS

| JP | 2000-213398 | 8/2000 |
| JP | 2000-274296 | 10/2000 |

* cited by examiner

Primary Examiner—Willis R. Wolfe
Assistant Examiner—Johnny H. Hoang
(74) Attorney, Agent, or Firm—Crowell & Moring LLP

(57) ABSTRACT

A diagnostic apparatus for gas mixture supply apparatus and diagnostic method thereof characterized in that, when any trouble has occurred to gas mixture from a gas mixture supply apparatus, it can be identified as an error; and at least engine startup is ensured, continued operation of the engine can be made enabled without any problem which may cause stalling of the engine, and deterioration of exhaust gas can be prevented. The above object can be attained by the present invention comprising a gas mixture state detecting means for detecting the state of gas mixture when gas mixture is supplied from the aforementioned gas mixture supply means during the operation of the aforementioned evaporation means, and evaluation means for evaluating an error of the aforementioned gas mixture supply means based on the result of detection by the aforementioned gas mixture state detecting means.

28 Claims, 13 Drawing Sheets

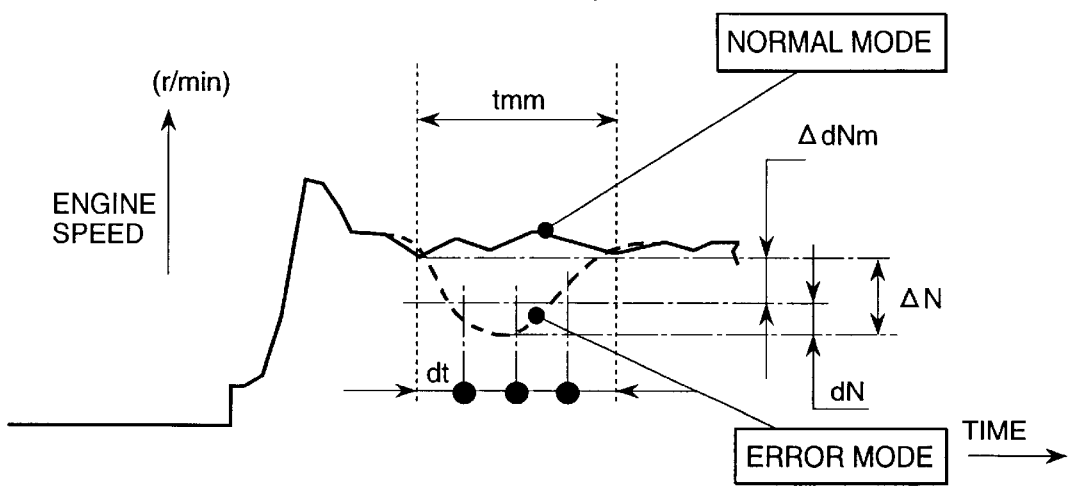
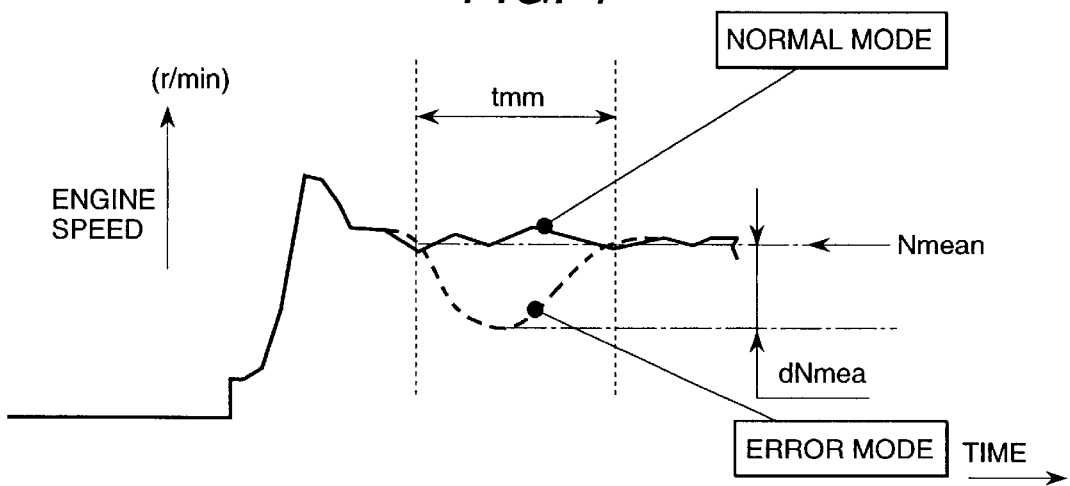
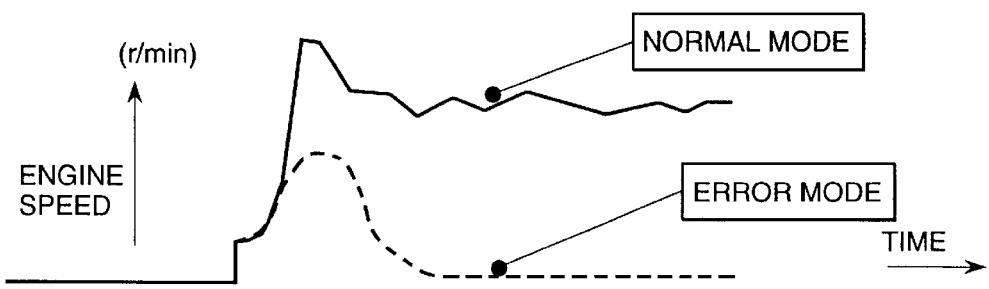

DIAGNOSTIC APPARATUS FOR GAS MIXTURE SUPPLY APPARATUS AND DIAGNOSTIC METHOD THEREOF

BACKGROUND OF THE INVENTION

The present invention relates to a diagnostic apparatus for a gas mixture supply apparatus and diagnostic method thereof. More particularly, it relates to a trouble diagnostic apparatus of the gas mixture supply apparatus of an internal combustion engine equipped with gas mixture supply means for supplying gas mixture from upstream of the main fuel injection valve, a diagnostic method thereof and improvement of fail-safe measures.

In the prior art proposal, fuel injected by a fuel injection valve is heated and evaporated by a heater provided on an intake passage, thereby reducing the amount of fuel deposited on the intake passage and intake valve, and improving combustion at the time of starting a freezer, in particular. It also proposes a method for reducing the emission volume of hazardous hydrocarbon. For example, U.S. Pat. No. 5,894,832 proposes that a fuel injection valve (upstream fuel injection valve) and a heater are installed in an auxiliary air passage for bypassing an upstream throttle valve in addition to a fuel injection valve main fuel injection valve) provided close to the intake port of each cylinder. This configuration allows fuel to be injected from the upstream fuel injection valve to the heater in the warm-up process after starting the freezer, and prevents fuel from depositing on the intake passage by fuel evaporation promoted by the heater, thereby improving combustion.

According to the aforementioned known example, furthermore, gas mixture formation is improved by supply of evaporated fuel into the cylinder, with the result that combustion is improved. Accordingly, stable combustion can be ensured even if the delay angle for ignition timing in the idling operation after startup is made greater than the conventional engine without heater. This provides an advantage of reducing the amount of emitted hazardous hydrocarbon (HC) after startup of the freezer, by heating and evaporating fuel through a heater and increasing the delay angle for ignition timing so that exhaust temperature is raised to promote the activity of catalyst. The aforementioned known example also discloses a method for evaluating an error by heater current value when the data current detecting means is provided.

Japanese Application Patent Laid-Open Publication Nos. 2000-213398 and 2000-274296 disclose a method for improving combustion in the area of high speed and high load especially through homogenous air intake in a direct injection spark ignition type internal combustion engine, alternating current they are not directly intended to improve of combustion at the time of freezer startup. Namely, they disclose a fuel injection control apparatus provided with switching control means to ensure that fuel supply function is shared between the main fuel injection valve for direction injection of fuel into a combustion chamber and an auxiliary fuel injection valve capable of supplying fuel in the intake passage, wherein they propose means for diagnosing a trouble of the auxiliary fuel injection valve based on a predetermined operation condition—an air-fuel ratio detected in the area of high speed and high load, according to disclosed embodiments.

The prior art gas mixture supply apparatus, however, has the following problems.

According the aforementioned patent, when fuel is supplied from the upstream fuel injection valve, combustion is improved by allowing fuel to be deposited on the heater and to be evaporated therefrom. Accordingly, injection on the side of the main fuel injection valve is almost completely stopped during the use. Further, detection of heater current makes it possible to detect clearly a detectable phenomenon such as a heater current error, for example, when the heater has been extremely deteriorated or a cable of the power supply system for the heater has been disconnected. Even if there is an error as a gas mixture, however, an error of gas mixture cannot be detected when a not very conspicuous deterioration of heater performance has occurred or when an error of the upstream fuel injection valve has occurred even if there is no error as a heater performance—for example, when there is a decrease in the area pf flow path, hence decrease in the amount of fuel injection, for example, due to blocking of a passage for supplying fuel to the upstream fuel injection valve and mixture of foreign substances into the fuel injection valve or their deposition therein. Thus, supply of a sufficient amount of evaporation fuel is stopped without an error being identified as such, so the effect of combustion improvement cannot be ensured. This may lead to increase in the amount of emitted hydrocarbon, stalling of an engine or complete combustion failure in the worst case, according to the prior art.

In the operation mode where independent injection of a gas mixture supply apparatus with upstream fuel injection valve is performed after startup by the main fuel injection valve especially during the period of operation period including startup cranking, stalling of the engine occurs almost at the same time as it has started to rotate under its own power if there is an error in the gas mixture supply apparatus, for example, in the aforementioned heater or upstream fuel injection valve. Traveling cannot be performed in the worst case. Such a problem is found out in the prior art.

The art disclosed in Japanese Application Patent Laid-Open Publication Nos. 2000-213398 and 2000-274296 are intended to improve combustion in the area of high speed and high load especially though homogenous air intake in a direct injection spark ignition type internal combustion engine. So switch control means for sharing control with the main fuel injection valve by operating the auxiliary fuel injection valve is set in the area of high speed and high load, and setting is made in advance to ensure that the air-fuel ratio in concurrent use of the auxiliary fuel injection valve and main fuel injection valve denotes a rich mixture, while the air-fuel ratio when fuel is injected only from the main fuel injection valve shows a lean mixture. Accordingly, if air-fuel ratio in the case of the main fuel injection valve alone is set to a weakly lean level, there is no conspicuous change in combustion. So there is no deterioration in maneuverability which may be felt as a shock by an operator, and detection is possible in terms of changes of air-fuel ratio. From the viewpoint of the gas mixture supply apparatus alone, however, when an error has occurred to the gas mixture supply apparatus, deterioration in maneuverability is easily recognized. This requires deterioration of the state of combustion to be quickly detected. In the detection by an air-fuel ratio sensor, mainly the O2 concentration is detected, so output on the side of lean mixture may be produced even in the case of characteristic misfiring of the engine. Even if mixture is inadequate as a gas mixture, air-fuel ratio error is not detected when the ratio between air and fuel is not incorrect. Such a problem is found in the prior art. Further, the engine starts to rotate under its own power during the period of operation including startup cranking. This corresponds to the transient area characterized by a big change in combustion. Early detection of deterioration of the state of combustion is difficult, and diagnosis based on the air-fuel ratio may contain incorrect detection. Such problem is found out in the prior art.

SUMMARY OF THE INVENTION

The present invention has been made to solve the aforementioned problems. The object of the invention is to provide a diagnostic apparatus for gas mixture supply apparatus and diagnostic method thereof, capable of, finding out an error in gas mixture by the gas mixture supply apparatus if there is any, ensuring at least the engine startup, permitting continued operation of the engine without a problem which may cause stalling of the engine, and preventing deterioration of exhaust gas.

To achieve the above object, a diagnostic apparatus for the aforementioned gas mixture supply apparatus according to the present invention is basically characterized in that;

in a gas mixture supply apparatus of an internal combustion engine comprising, a main fuel injection valve for supplying fuel to an internal combustion engine, an upstream fuel injection valve for supplying fuel to the area upstream from the aforementioned main fuel injection valve, and gas mixture supply means for supplying gas mixture from upstream of the aforementioned main fuel injection valve through an evaporation means for evaporating all or part of fuel supplied from the aforementioned upstream fuel injection valve;

the aforementioned diagnostic apparatus for the aforementioned gas mixture supply apparatus comprises, gas mixture state detecting means for detecting the state of gas mixture when gas mixture is supplied from the aforementioned gas mixture supply means with the aforementioned evaporation means operating, and evaluation means for evaluating an error of the aforementioned gas mixture supply means based on the result of detecting the aforementioned gas mixture state detecting means.

A diagnostic apparatus for the aforementioned gas mixture supply apparatus according to the present invention is basically characterized in that;

in a gas mixture supply apparatus of an internal combustion engine for supplying gas mixture from the area upstream of the aforementioned main fuel injection valve utilizing, a main fuel injection valve for supplying fuel to an internal combustion engine, an upstream fuel injection valve for supplying fuel to the area upstream from the aforementioned main fuel injection valve, a heater member for heating all or part of fuel supplied from the aforementioned upstream fuel injection valve and evaporating it, and heater control means for controlling application of electric power to the aforementioned heater member;

the aforementioned diagnostic apparatus for a gas mixture supply apparatus comprising, gas mixture state detecting means for detecting the state of gas mixture formed when fuel is supplied from the aforementioned upstream fuel injection valve with electric power applied to the aforementioned heater member by the aforementioned heater control means, and evaluation means for evaluating an error of the aforementioned upstream fuel injection valve and/or the aforementioned heater member based on the result of detecting the aforementioned gas mixture state detecting means.

The embodiment of a diagnostic apparatus for gas mixture supply apparatus according to the present invention is configured in such a way that; the aforementioned evaporation means consists of a heater member and heater control means, the aforementioned gas mixture state detecting means detects gas mixture state based on the result of detecting one or more of the engine speed, intake manifold pressure, combustion pressure, torque value, exhaust temperature, HC concentration, NOx concentration and CO concentration, and evaluation means for evaluating the aforementioned error detests the state of gas mixture based on the result of detecting at least one of the aforementioned gas mixture state detecting means, the amount and rate of change, deviation from a predetermined target value and fluctuating surge.

A diagnostic apparatus for gas mixture supply apparatus according to the present invention configured in the aforementioned manner identifies an error if the state of gas mixture is detected and a predetermined preset degree of deterioration is exceeded, in cases where the gas mixture supply apparatus has (1) a heater-related error caused by <a> decrease in the amount of evaporated fuel supplied from the upstream fuel injection valve due to heater deterioration and <b> disconnection of a cable in power supply system for the heater; or (2) a gas mixture-related error caused by decrease in the area exposed to flow or decrease in the amount of fuel injection due to blocking of fuel supply passage leading to the upstream fuel injection valve or entry or deposition of foreign substances in the fuel injection valve.

A diagnostic apparatus for gas mixture supply apparatus according to the present invention further comprises fail-safe control means which immediately or progressively implements (1) a step of reducing the amount of fuel or stopping the supply of fuel in response to the evaluation made by the aforementioned evaluation means as containing an error, (2) a step of increasing the amount of fuel supplied from the aforementioned main fuel injection valve or switching to the aforementioned main fuel injection valve, (3) a step of stopping the aforementioned evaporation means or stopping application of electric power to the aforementioned heater member, and (4) a step of correcting ignition timing;

wherein the aforementioned fail-safe control means is used in such a way as to prevent the operation status of the aforementioned internal combustion engine and/or the amount of exhaust gas from being deteriorated.

A diagnostic apparatus for gas mixture supply apparatus according to the present invention configured in the aforementioned manner at least ensures engine startup, permits continued operation of the engine and prevents deterioration of exhaust gas.

A diagnostic apparatus for gas mixture supply apparatus according to the present invention further comprises;

main fuel supply evaluation means containing (a) a step of injecting fuel through the aforementioned main fuel injection valve at least during start cranking, and (b) a step of evaluating fuel supply as being normal through the aforementioned main injection valve when engine speed has exceeded a predetermined level or intake manifold pressure has been reduced below a predetermined level; and a fuel supply change means containing (a) a step of reducing the amount of fuel or stopping the supply of fuel in response to the evaluation made by the aforementioned main fuel supply evaluation means as being normal, (b) a step of increasing the amount of fuel supplied from the aforementioned upstream fuel injection valve or switching to the aforementioned upstream fuel injection valve, and (c) a step of performing operation of the aforementioned evaporation means or applying electric power to the aforementioned heater member.

A diagnostic apparatus for gas mixture supply apparatus according to the present invention configured in the aforementioned manner is characterized in that, at least when the aforementioned main fuel supply means evaluation by a main fuel injection valve has been found out to be normal, diagnosis is performed by the upstream fuel injection valve selected by switching. This characteristic avoids incorrect evaluation which may be caused by evaluation of an error in gas mixture supply means being adversely affected by the error of the aforementioned main fuel supply means.

A diagnostic apparatus for gas mixture supply apparatus according to the present invention further comprises;
  an auxiliary air passage for bypassing a throttle valve,
  an auxiliary air passage valve for regulating the amount of air in the aforementioned auxiliary air passage,
  target speed control means for controlling the aforementioned auxiliary air passage valve to reach a predetermined target speed after the aforementioned internal combustion engine has started and has been evaluated,
  ignition timing control means for controlling ignition timing to be on the side of delay angle at least when fuel is supplied from the aforementioned upstream fuel injection valve, and
  evaluation means for evaluating one or more errors in the aforementioned upstream fuel injection valve, heater member and auxiliary air passage valve, based on the result of detection by the aforementioned gas mixture state detecting means when the aforementioned ignition timing is controlled to be on the side of delay angle.

A diagnostic apparatus for gas mixture supply apparatus according to the present invention configured in the aforementioned manner is characterized in that the degree of deterioration can be evaluated while the state of combustion of ignition timing with respect to delay angle is detected. This avoids extreme increased in the amount of hydrocarbon emission or the worse stalling of an engine.

Another embodiment of the present invention is characterized in that the aforementioned ignition timing control means performs control of ignition timing in terms of delay angle in a predetermined number of times.

Still another embodiment of the present invention is characterized in that the aforementioned gas mixture state detecting means detects the state of gas mixture based on the result of detecting one or more of the amounts of air, auxiliary air passage valve control and fuel injection.

A further embodiment of the present invention is characterized comprising;
  means for evaluating the deterioration of battery, and
  means for evaluating the aforementioned gas mixture supply means for an error based on the result of detecting battery voltage when fuel is supplied from the aforementioned upstream fuel valve after evaluation is made to determine that a battery is not deteriorated.

Still further embodiment of the present invention is characterized in that the aforementioned gas mixture state detecting means detects the state of gas mixture based on;

the result of detection by heater current detecting means for detecting the current applied to the aforementioned heater member, and the aforementioned heater current detecting means subsequent to electric power to the aforementioned heater member having been applied to the aforementioned heater member; and the trouble setup value of a heater current to be set in conformity to the amount of fuel injection in advance.

Still further embodiment of the present invention is characterized by comprising error storage means for storing an error when such an error has been found out by the aforementioned evaluation means, and/or error alarm means for alarming an error.

Still further embodiment of the present invention is characterized in that the aforementioned evaporation means performs at least one of evaporation by an electric heater, heater evaporation by combustion, evaporation by ultrasonic vibration, evaporation by hot water and evaporation by exhaust gas temperature.

A diagnostic method for gas mixture supply apparatus according to the present invention is characterized by comprising;
  a main fuel injection valve for supplying fuel to an internal combustion engine,
  an upstream fuel injection valve for supplying fuel to the area upstream from the aforementioned main fuel injection valve, and
  gas mixture supply means for supplying gas mixture from upstream of the aforementioned main fuel injection valve through an evaporation means for evaporating all or part of fuel supplied from the aforementioned upstream fuel injection valve; the aforementioned diagnostic method further comprising;
    a step of detecting the state of gas mixture when gas mixture is supplied from the aforementioned gas mixture supply means with the aforementioned evaporation means operating, and
    a step of evaluating an error of the aforementioned gas mixture supply means based on the aforementioned result of detection.

BRIEF DESCRIPTION OF THE DRAWINGS

FIG. 3 is a drawing representing a specific method for a gas mixture supply apparatus of a diagnostic apparatus for gas mixture supply apparatus according to the present embodiment;

FIG. 4 is a drawing representing a specific method for a gas mixture supply apparatus of a diagnostic apparatus for gas mixture supply apparatus according to the present embodiment;

FIG. 5 is a drawing representing a specific method for a gas mixture supply apparatus of a diagnostic apparatus for gas mixture supply apparatus according to the present embodiment;

DETAILED DESCRIPTION OF THE PREFERRED EMBODIMENT

Figure 1:
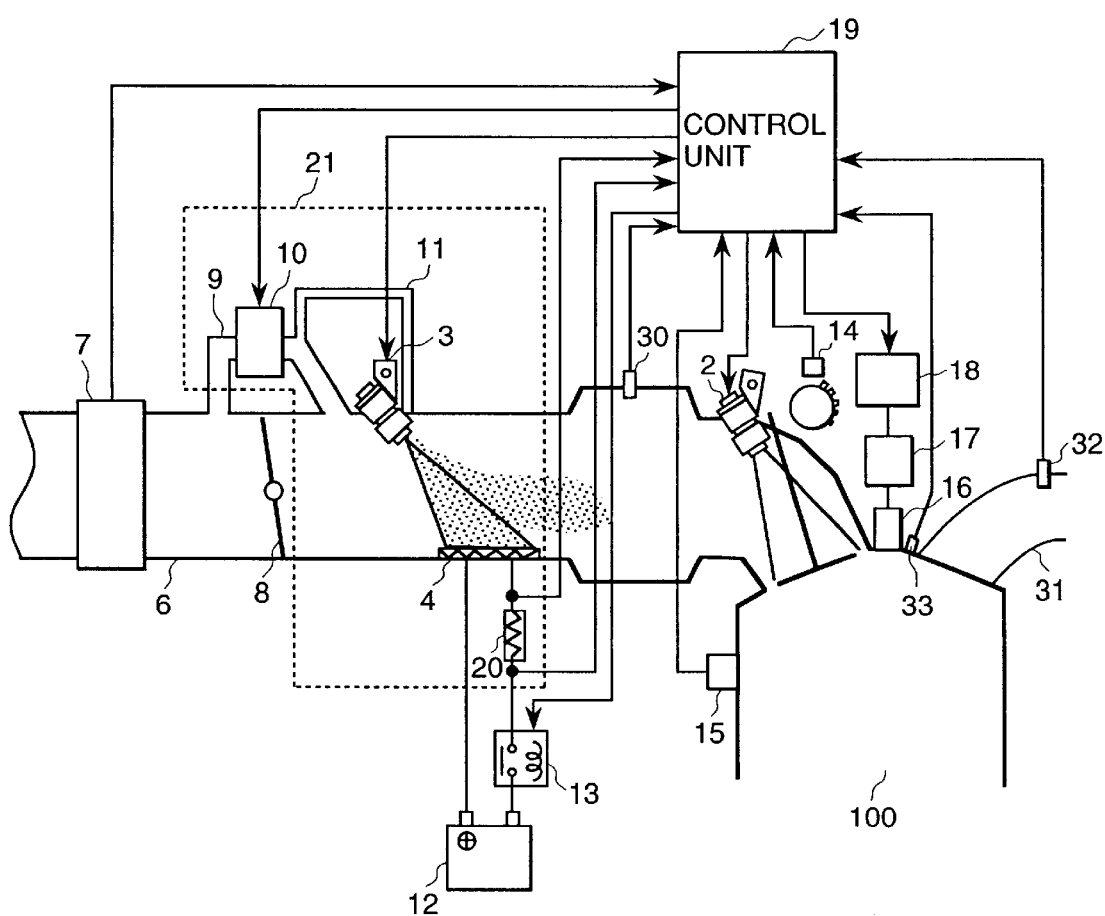
FIG. 1 is a drawing representing the engine system equipped with a diagnostic apparatus for a gas mixture supply apparatus as one embodiment of the present invention.

The following describes a diagnostic apparatus for gas mixture supply apparatus and diagnostic method thereof as one embodiment according to the present invention with reference to drawings:

FIG. 1 is a drawing representing the configuration of an engine system equipped with a diagnostic apparatus for a gas mixture supply apparatus as an embodiment of the present invention.

In FIG. 1, numeral 100 denotes an engine. A sucked air volume sensor 7 and a throttle valve 8 are mounted in an intake passage 6 of the engine 100. A main fuel injection valve 2 is mounted at the intake port inlet of each cylinder. An upstream fuel injection valve 3 as an air-assisted high atomizing injection valve and an air passage 11 for capturing fuel atomizing air from upstream of a throttle valve 8 and supplying it to the upstream fuel injection valve 3 are provided on the upstream portion of intake passage 6. It is widely known that fuel generally flows into the cylinder without depositing on the intake passage if injection fuel is atomized to about ten microns in diameter. Injection fuel of the upstream fuel injection valve 3 is atomized to about ten microns to ensure that the fuel attached to the intake passage 6 will be reduced.

A heater member 4 (evaporation means) is installed on the upstream fuel injection valve 3 in the direction of injection. A PTC heater (thermister with positive characteristic) capable of keeping temperature at a predetermined level can be used as heater member 4. The PTC heater is a self-heat generation and self-control type heater which automatically increases the Joule heat of OTC heater itself and keeps heater temperature constant, despite reduction of ambient temperature. The operation temperature is uniquely defined by its material composition, and can be selected in the temperature range from 100 to 300 degrees Celsius. Further, the Curie point can be freely changed by changing the composition of the PTC ceramic constituting the PTC heater. Electric power is supplied to this heater member 4 from a battery 12 via a heater relay 13. Heater current is detected by the terminal voltage of heater current detecting means 20 (heater current detecting means).

An auxiliary air passage 9 bypassing a throttle valve 8 is provided with an idle speed control valve (hereinafter referred to as "ISC valve") for adjusting the amount of auxiliary air, or an auxiliary air passage control valve 10 such as air valve for opening or closing the passage by turning on or off electric power.

Here the auxiliary air passage 9 has its outlet formed in such a way that air will be directed toward the heater member 4. There is a slight variation in the fuel particle diameter of upstream fuel injection valve 3. Some fuel particles have greater diameter. The fuel injected from the upstream fuel injection valve 3 and having smaller particle diameter is carried to the downstream area by air flow and is put directly into the cylinder. This allows only the fuel with greater particle diameters to be deposited on the heater member 4 and to be evaporated.

A gas mixture supply apparatus 21 is composed of the aforementioned upstream fuel injection 3, auxiliary air passage 9, passage valve 10, air passage 11, heater member 4 and heater current detecting resistor 30.

Air whose flow rate is adjusted by a throttle valve 8 and which is promoted for evaporation by the heater member 4 is mixed with fuel injected from the fuel injection valve (injector) 3 arranged on the upstream side of the cylinder and is supplied to each cylinder, and is subjected to combustion.

Exhaust gas of fuel burnt in each of the aforementioned cylinders is led to a catalyst converter (not illustrated) through an exhaust pipe 31 where it is purified and discharged. An oxygen concentration sensor 33 for sending an air-fuel ratio signal linear with respect to exhaust air-fuel ratio is arranged on an exhaust pipe 31 wherever required.

An intake manifold pressure sensor 30 for detecting pressure in the intake manifold on the downstream side of the heater member 4 intake passage 6, a crank angle sensor 14 set to a predetermined crank angle position of the engine as one of the means for detecting the engine speed, an ignition apparatus for supplying ignition energy to an ignition plug 16 for firing the gas mixture of fuel supplied into the engine cylinder through an ignition coil 17 and a power switch 18 based on ignition signal, a hot water sensor 15 for detecting engine coolant temperature and a combustion pressure sensor 33 for detecting combustion pressure in the cylinder are arranged at respective specified positions of the aforementioned engine 100.

Each sensor signal is sent to a control unit 19, and the main fuel injection valve 2, upstream fuel injection valve 3, heater member 4, heater relay 13, ISC valve 10 and power switch 18 are controlled by the control unit 19.

The aforementioned oxygen concentration sensor 32 shown in the present embodiment outputs a signal proportional air-fuel ratio of exhaust gas. It may output two signals for exhaust gases on the rich and lean sides with respect to theoretical air-fuel ratio.

The control unit 19 is arranged in the car body or engine room. Based on the electrical signal sent from the aforementioned various sensors, this unit performs predetermined computations. To ensure the optimum control of the operation, it produces signals for opening/closing operation of the upstream fuel injection valve 3 and main fuel injection valve 2, driving of heater member 4, actuation of ignition plug 16, and opening/closing operation of the aforementioned idling speed control valve. Further, the control unit 19 provides air-fuel ratio control of the mixture gas supplied to the aforementioned engine, ignition control and idling speed control (ISC) as well as fuel control including an air-fuel ratio correction coefficient learning method.

Figure 2:
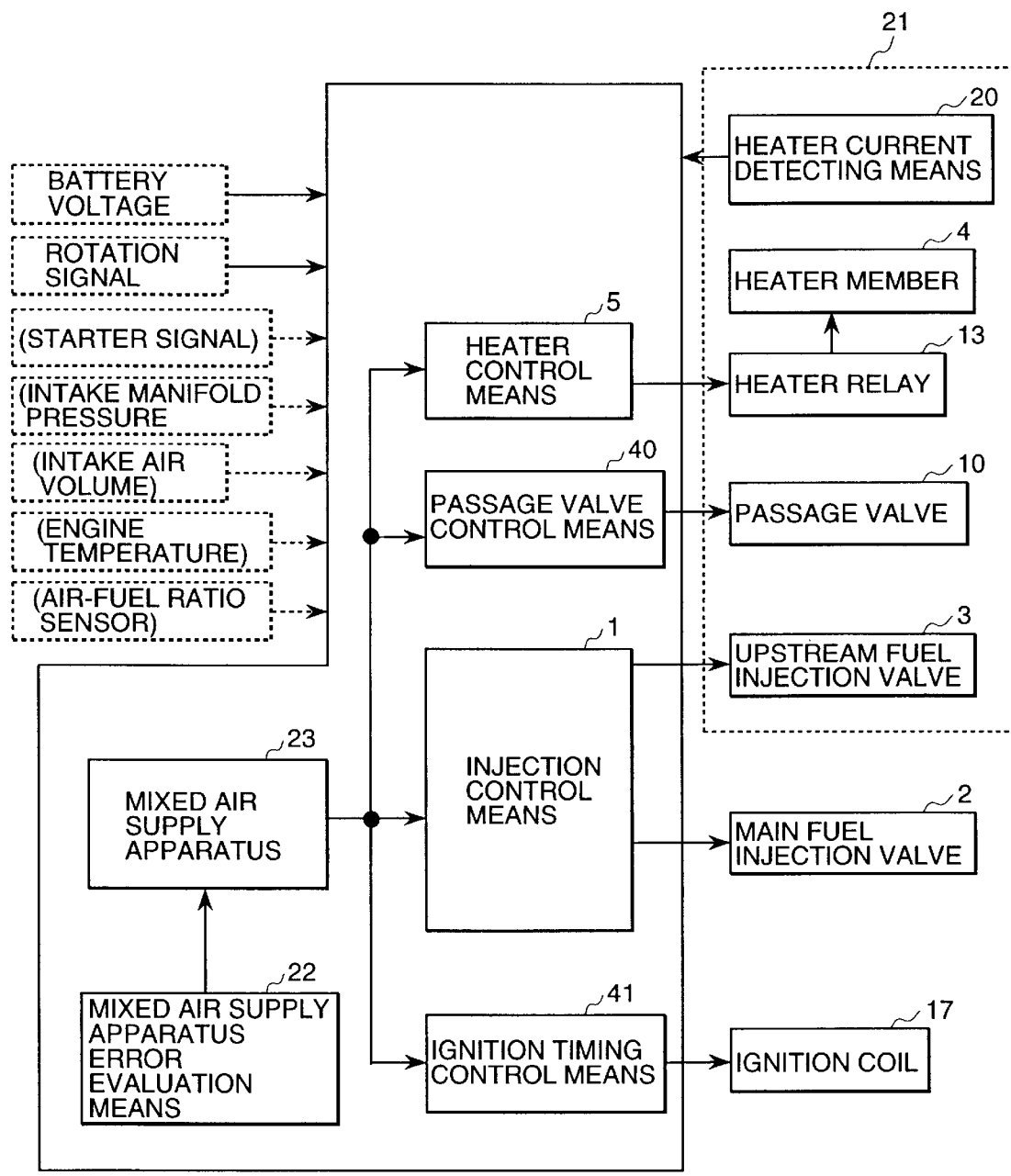
FIG. 2 is a drawing representing the configuration inside a control unit and gas mixture supply apparatus of a diagnostic apparatus for gas mixture supply apparatus according to the present embodiment.

FIG. 2 is a drawing representing the configuration inside a control unit 19 and gas mixture supply apparatus 21. The control unit 19 comprises;

an input/output interface (I/O) for converting electric signals of sensors installed on the engine into signals for digital computation, and signals for digital computation into actuator drive signals, a computation apparatus (MPU) for identifying engine state from the signal for digital computation sent from the I/OLSI, calculating the volume of fuel required by the engine and ignition time according to the programmed procedure and sending the result of calculation to the I/OLSI, a non-volatile memory (EP-ROM) for storing the computation apparatus control procedure and control constant, and a volatile memory (RAM) for storing the result of calculating the computation apparatus.

The aforementioned I/O LSI into digital computation signals the digital signals of the aforementioned sucked air volume sensor 7, the aforementioned crank angle sensor 14, the aforementioned coolant temperature sensor 15, the aforementioned intake manifold pressure sensor 30, the aforementioned oxygen concentration sensor 33, and various sensors for a ignition switch, battery voltage, clutch switch, etc.

The aforementioned computation apparatus (MPU) identifies the state of the engine 100 based on the digital computation signal converted by the aforementioned I/OLSI, calculates the fuel volume required by this engine 100 and ignition timing according to the procedure predetermined by the aforementioned EP-ROM, stores the result of this calculation in the aforementioned RAM and sends it to the aforementioned I/OLSI. This I/OLSI converts the digital control signal into the drive signal of each actuator, and sends each of the drive signals for opening command value, first to n-th cylinder fuel injection valve signal and first to n-th cylinder ignition coil signal to the idling speed control valve, upstream fuel injection valve 3, main fuel injection valve and ignition flag 16. The aforementioned RAM is connected with the backup power supply to store the memory contents even when power is not supplied to the control unit 19.

The gas mixture supply functional section of the aforementioned control unit 19 comprises;

gas mixture supply apparatus error evaluation means 3, a gas mixture supply apparatus fail-safe means 23, injection control means 1 for controlling an upstream fuel injection valve 3 and main fuel injection valve 2, heater control means 5, passage valve control means 40 for controlling passage valve 10, and ignition timing control means 41 for controlling an ignition coil 17.

In FIG. 2, the gas mixture supply apparatus 21 comprises heater current detecting means 20 consisting of an upstream fuel injection 3, passage valve 10, heater relay 13 and heater member 4 and heater current detecting resistor.

The following describes the operation of the diagnostic apparatus for gas mixture supply apparatus 21 and diagnostic method thereof as configured in the manner described above.

Figure 7:
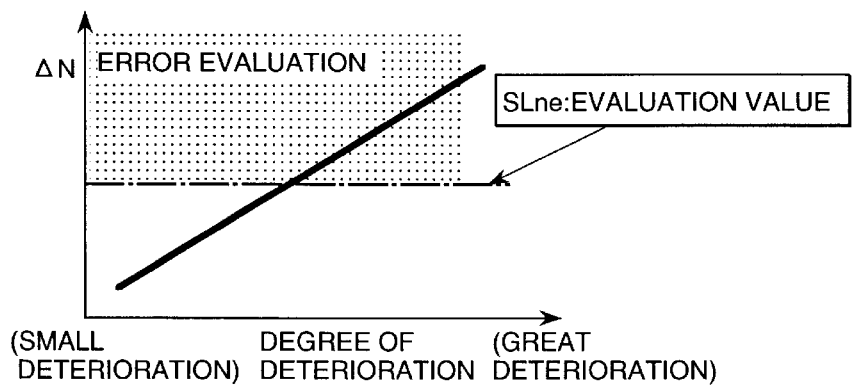
FIG. 7 is a drawing representing the relationship between a change in engine speed ΔN and degree of deterioration in a diagnostic apparatus for gas mixture supply apparatus according to the present embodiment.

First, The following shows the specific method of functioning of gas mixture supply apparatus error evaluation means 23 for detecting an error of gas mixture supply apparatus 21, with reference to FIGS. 7 to 5.

FIG. 1 is a drawing representing a specific method of gas mixture supply apparatus error evaluation means 23.

FIGS. 3 to 5 show an example of the gas mixture supply apparatus 21 comprising a heater member as evaporation means for heating and evaporating all or part of the injection fuel of the upstream fuel injection valve 3 in the direction of injection from a passage valve 10, a upstream fuel injection valve and the aforementioned upstream fuel injection valve 3.

In the aforementioned configuration, especially the gas mixture by evaporation means provides an advantage of reducing the amount of the emission of hazardous hydrocarbon (HC) after startup of a freezer, by increasing the delay angle of ignition timing, raising the exhaust gas temperature and promoting the activity of catalyst, without depending on such gasoline properties as mass and light weight. Accordingly, the state of gas mixture appears most conspicuously in the engine behavior. Thus, to ensure quick detection of the state of gas mixture, the most preferred method is to get correct information on engine behavior. Another method is to check the state of engine combustion by gas mixture and components of exhaust gas to evaluate the state of gas mixture.

FIG. 3 is a drawing representing the behavior of engine speed when gas mixture is supplied from the gas mixture supply apparatus after engine startup.

In FIG. 3, a solid line shows the behavior where there is no error to the gas mixture supply means, while a broken line shows the case where there is some problem. In this case, the change of engine speed N is greater than when there is no error.

When the aforementioned gas mixture state detecting means detects the engine speed, evaluation means for evaluating an error of the aforementioned gas mixture supply means is based on the method of detecting in terms of the range $\Delta N$ of the maximum change in the engine speed during the specified period (tmm) shown in FIG. 3, the method of detecting in terms of the maximum value $\Delta dNm$ in a predetermined time (tmm) by detecting the change (dN) in a predetermined time (dt) or the method of evaluating in terms of the deviation (dNmea) from the target engine speed (Nmea) as shown in FIG. 4. Without being restricted to these methods, combustion of only a particular cylinder can be deteriorated due to the difference in the change among various cylinders. Accordingly, it is possible to make evaluation in conformity to the magnitude of surge occurring within a predetermined time (tmm).

FIG. 5 is a drawing representing the behavior of the engine speed when operation is started by the upstream fuel injection valve 3 subsequent to startup cranking and application of electric power. The gas mixture supply apparatus 21 is evaluated as containing an error if the engine speed has failed to reach a predetermined value, in a predetermined time from cranking, e.g. within 5 to 10 seconds after cranking has started when the ambient temperature is normal 30 degrees Celsius, and within 30 seconds at an extremely low temperature.

Figure 6:
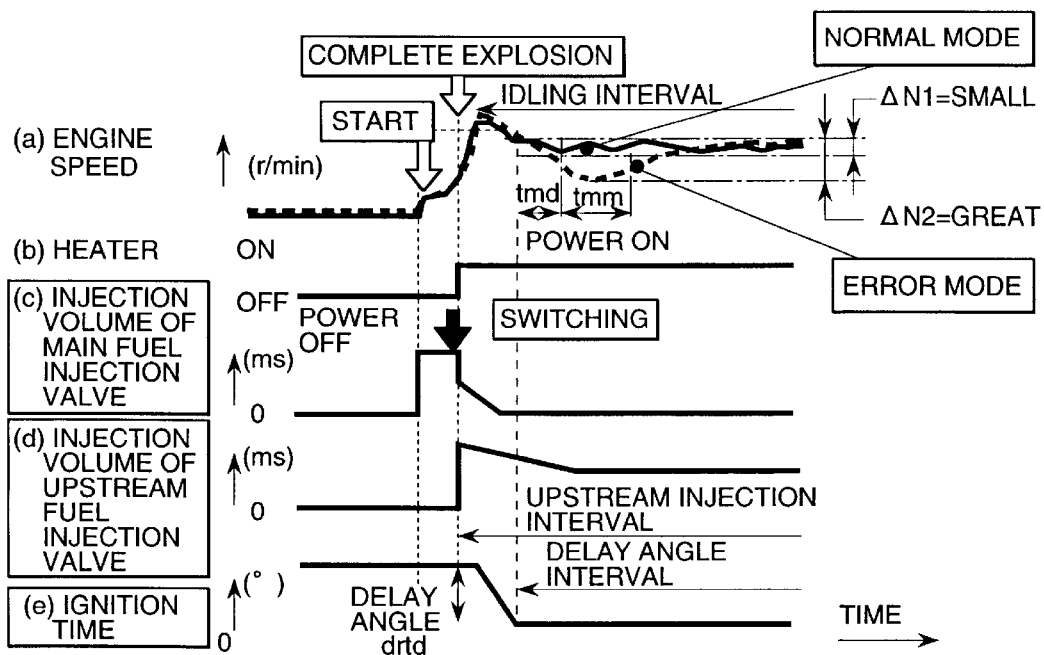
FIG. 6 is a drawing representing further details of a specific method for a gas mixture supply apparatus of a diagnostic apparatus for gas mixture supply apparatus according to the present embodiment.

FIG. 6 is a drawing representing the details of a specific operation method of gas mixture supply apparatus error evaluation means 23.

First, startup cranking is carried out by a starter and injection is performed by main fuel injection valve 2 to start up, as shown in FIG. 6(c). This is because, when gas mixture is supplied only by gas mixture supply apparatus 21 from the start, mixture is supplied from the upstream side if the main fuel injection valve 2, so there is a big intake manifold volume up to the cylinder resulting in a delay of transport, and this requires a long startup time. So solve this problem, fuel is supplied by the main fuel injection valve 2 at the time of startup. After the engine has started, gas mixture is supplied from the gas mixture supply apparatus 21 by a switching method. This has an advantage of reducing the startup time. Further, when evaluation of the aforementioned main fuel supply means using the main fuel injection valve 2 is correct without error, diagnosis is performed by switching to the upstream fuel injection valve 3. This prevents incorrect evaluation from being made by error evaluation for gas mixture supply means being adversely affected by some error of the aforementioned main fuel supply means.

Fuel is supplied by the upstream fuel injection valve 3 from the time of cranking. Fuel supply means of main fuel injection valve 2 is evaluated as normal by main fuel supply evaluation means if the engine speed has reached a predetermined value (complete explosion evaluation level), e.g. 800 rpm within a predetermined time, e.g. within 10 seconds after cranking has started when ambient temperature is normal 30 degrees Celsius or more, or within 30 seconds at an extremely low temperature. If the engine speed fails to reach the predetermined time, the main fuel injection valve 2 and other devices or the like related to main fuel injection are evaluated as containing an error. After the main fuel injection valve 2 has been evaluated as normal, the share of injection of the main fuel injection valve 2 is subjected to a stepwise reduction, and this injection is stopped ultimately, as shown by a solid line in FIG. 6(c). In the meantime, if the injection by upstream fuel injection valve 3 is reduced in a stepwise manner as shown by a solid line in FIG. 6(d), then there is less delay on the fuel inflow into the cylinder than when startup is performed by the upstream fuel injection valve 3. Less fuel is deposited on the intake passage evaporated fuel is supplied by upstream fuel injection valve 3 after startup, without startup property being deteriorated. So the stability is improved, and hence combustion is improved. Further, in this case, application of electric power to heater member 4 is started upon starting of the injection by upstream fuel injection valve 3, as shown in FIG. 6(b).

After the aforementioned upstream fuel injection valve 3 has started injection, delay angle of ignition timing can be corrected, and exhaust temperature can be raised to promote the activity of catalyst, as shown in FIG. (e). With consideration given to power consumption by the heater member 4, for example, electric power is applied to the heater member 4 for tens of seconds before activation of catalyst after freezer startup, and injection is carried out by the and upstream fuel injection valve 3 to promote activation of catalyst. Before traveling is started after that (not illustrated), injection of upstream fuel injection valve 3 and application of electric power to the injection and heater member 4 are stopped. Then injection is performed after switching to the main fuel injection valve 2.

Means for switching between the aforementioned main fuel injection valve 2 and upstream fuel injection valve 3 controls the amount of fuel in a stepwise manner in such a way that the fuel is supplied independently. If control of the amount of is given in terms of injection pulse width, it is also possible to set up an ineffective pulse width wherein a required volume of fuel cannot be supplied even if pulse width is given. Further, switching mean is also provided if the share of injection on the part of the injection valve as a major fuel supplier is set to a greater percentage.

In the engine speed shown in FIG. (a), the behavior indicated by a solid line shows the case where there is no problem to the performance of the gas mixture supply apparatus 21 consisting of the upstream fuel injection valve 3. Detection is made of the maximum variation range AN1 of engine speed within a predetermined time set in terms of tmm after a predetermined tmd after the delay angle of ignition timing shown in FIG. 6(e) is corrected up to a predetermined volume subsequent to startup of injection of the upstream fuel injection valve 3.

In the meantime, a broken line in FIG. 6(a) shows the behavior suggestive of some problem with the gas mixture supply apparatus 21 consisting of upstream fuel injection valve 3, for example, decrease in evaporated fuel supplied from the upstream fuel injection valve 3 due to heater deterioration, heater-related error due to cable disconnection in the power supply system to the heater member 4, or reduction in the area of the flow path due to blocking of the fuel supply passage to the upstream fuel injection valve 3 and entry or deposition of foreign substances in the fuel injection valve, resulting in decrease in the volume of fuel injection. The amount of change in speed is greater than when there is no problem. Detection is made of the maximum range $\Delta N3$ of change in engine speed within a predetermined time set in terms of tmm in a predetermined tmd from the time when the delay angle of the ignition timing shown in FIG. 6(e) is corrected to a predetermined volume (drtd). Accordingly, an error of the gas mixture supply apparatus 21 can be evaluated in terms of the maximum range of change in engine speed. Assume that the maximum range of change during this tmm is ΔN, then ΔN1<ΔN3. The magnitude of ΔN is correlated with the state of an error in the gas mixture supply apparatus 21, for example, the percentage of heater deterioration.

FIG. 7 is a drawing representing the relationship between the amount of change in engine speed ΔN and degree of deterioration. As the degree of deterioration is greater, an error is more likely to be evaluated, as shown in FIG. 7. In this case, the aforementioned amount of change in engine speed ΔN is approximately proportional to the degree of deterioration. The degree of deterioration is given in terms of a predetermined function of ΔN. Thus, a value affecting the exhaust gas performance and engine operation is preset as an evaluation value SLne. If ΔN exceeding this value has been detected, an error is determined. Alternatively, if ΔN exceeding this value has been found out, an error is determined. Alternatively, the degree of deterioration is obtained in a stepwise manner in conformity to ΔN. When a predetermined degree of deterioration has been exceeded, an error is determined.

Figure 8:
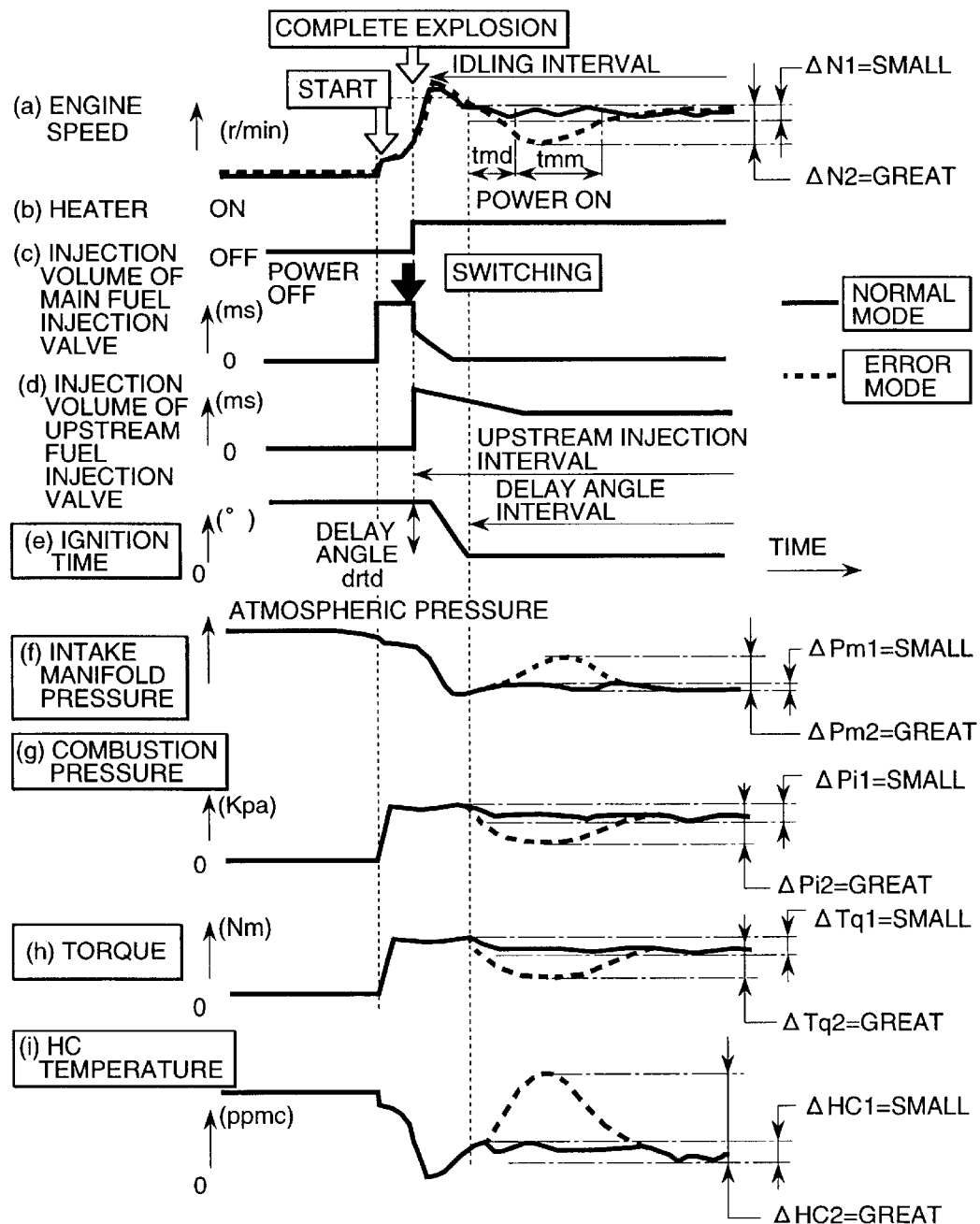
FIG. 8 is a drawing representing further details of a specific method for a gas mixture supply apparatus of a diagnostic apparatus for gas mixture supply apparatus according to the present embodiment.
Figure 9:
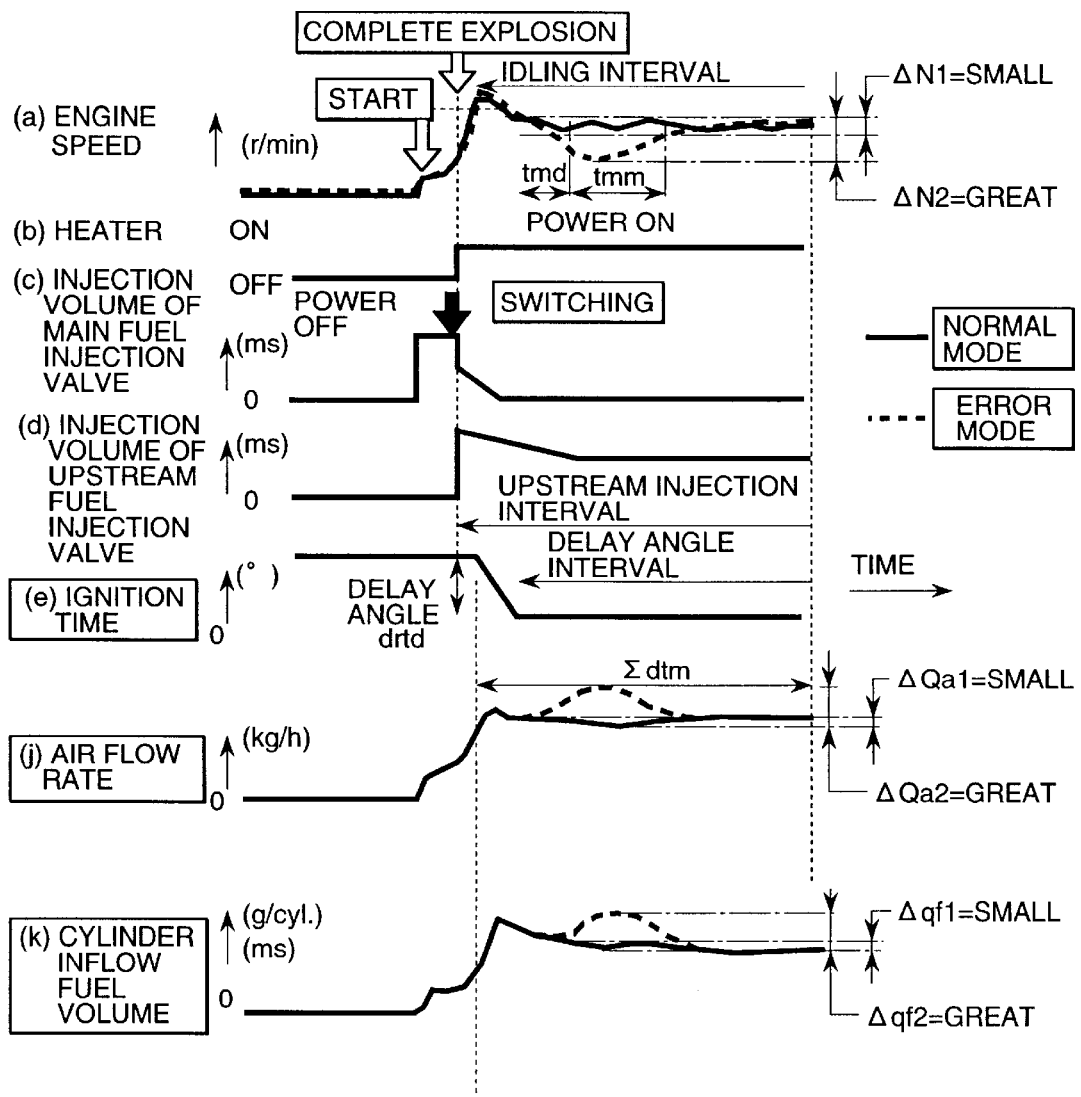
FIG. 9 is a drawing representing further details of a specific method for a gas mixture supply apparatus of a diagnostic apparatus for gas mixture supply apparatus according to the present embodiment.

FIGS. 8 and 9 are drawing representing further details of a specific method used in gas mixture supply apparatus error evaluation means 23.

Similarly to FIG. 6, FIG. 8 shows the aforementioned gas mixture state detecting means other than engine speed during a predetermined time period set in terms of tmm in a predetermined tmd from the time when delay angle of ignition timing shown in FIG. 8(e) has been corrected up to a predetermined amount after start of injection by the upstream fuel injection valve 3. It also shows a method of detecting an error of the aforementioned gas mixture supply apparatus 21 based on intake manifold pressure FIG. 8(f), combustion pressure in FIG. 8(g), torque value in FIG. 8(h) and HC concentration in FIG. 8(i).

Intake manifold pressure is detected by an intake manifold pressure sensor 30 installed on the intake manifold, combustion pressure by combustion pressure sensor 33 located in the vicinity of combustion chamber, torque value by a torque sensor mounted on the engine output shaft, and the HC concentration by HC sensor mounted on the exhaust pipe of engine 100. Similarly to FIG. 6, each solid line indicates the behavior when the aforementioned gas mixture supply apparatus 21 has no performance problem. The broken line indicates the behavior when the aforementioned gas mixture supply apparatus 21 has some problem. If there is no problem, gas mixture state detecting means shown in FIGS. 8(f) to (i) during the time period set in terms of tmm in a predetermined tmd from the time when the delay angle of ignition timing has been corrected up to a predetermined amount shown in FIG. 8(e) exhibits very small change, similarly to FIG. 6. However, if there is any problem, the change is greater than when there is no problem. This makes it possible to evaluate an error of the aforementioned gas mixture supply apparatus 21 in terms of the amount of change.

Figure 10:
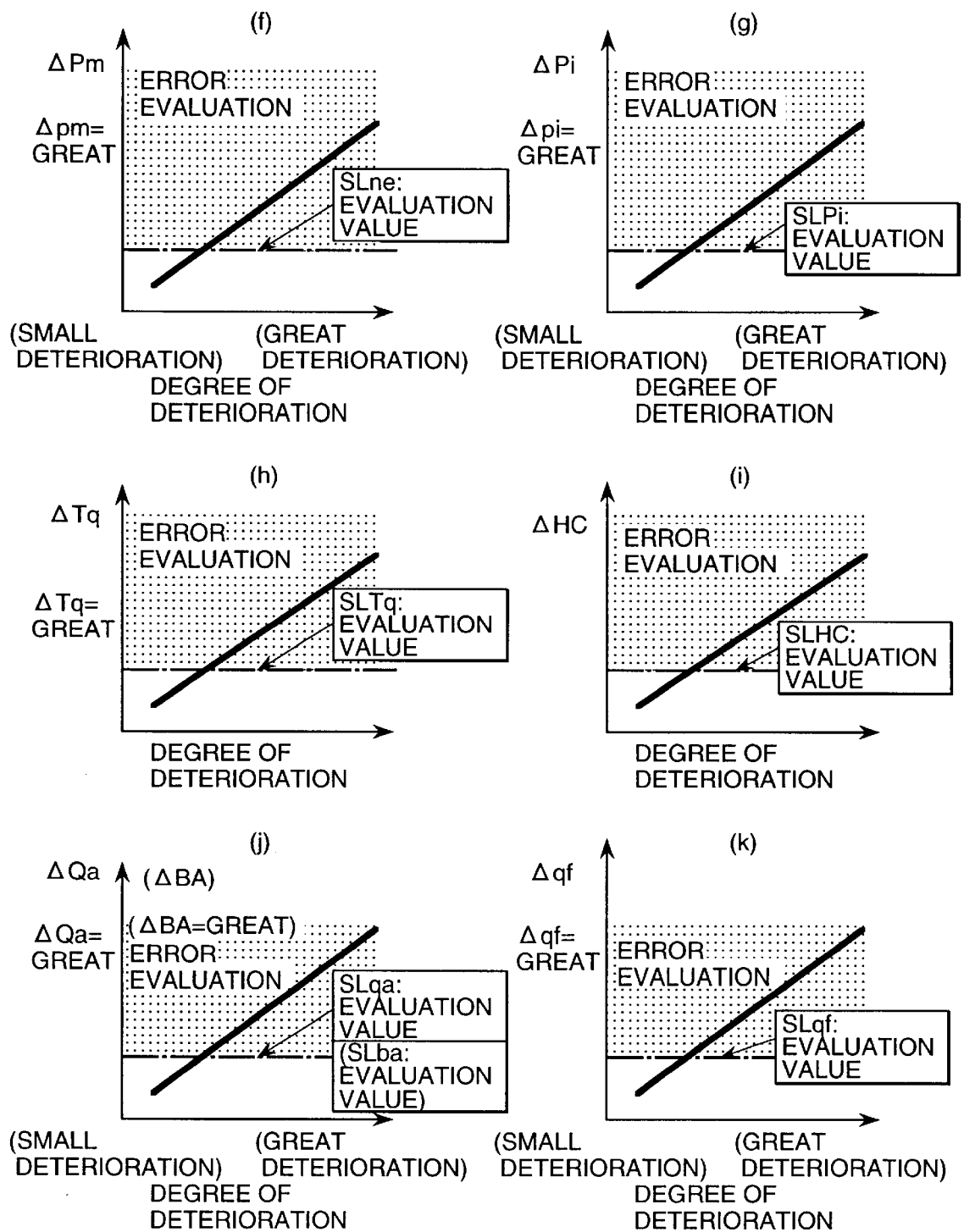
FIG. 10 is a drawing representing the relationship between a change in parameters and degree of deterioration in a diagnostic apparatus for gas mixture supply apparatus according to the present embodiment.

FIG. 10 shows the relationship between the amount of change in each parameter and degree of deterioration. FIGS. 10(f) to (i) correspond to the previous FIGS. (f) to (i) and FIGS. 10(j) and (k) to FIGS. (j) and (k) to be explained later.

When detection is made in terms of the amount of change ΔPm of the intake manifold pressure in FIG. 8(f), the magnitude of ΔPm is correlated to the state of an error in gas mixture supply apparatus 21, for example, to the degree of deterioration of the heater.

FIG. 10(f) shows the relationship between the aforementioned ΔPm and the degree of deterioration. In this case, the aforementioned dPm and degree of deterioration are almost proportional to each other. The degree of deterioration is given by a predetermined function of ΔPm. Accordingly, when ΔPm exceeding a preset threshold value SLPm has been detected, an error is determined. Alternatively, it is also possible to obtain the degree of deterioration in a stepwise manner in response to ΔPm. When the preset degree of deterioration has been exceeded, an error is determined.

Similarly, when detection is made in terms of the amount of change in combustion pressure ΔPi in FIG. 8(g) or the amount of change in torque value ΔTq in FIG. 8(h), the magnitude of ΔPi and ΔTq is correlated with the state of error in gas mixture supply apparatus 21, for example, the degree of deterioration of the heater.

FIGS. 10(g) and (h) shows the relationship between the magnitude of the aforementioned ΔPi and ΔTq and the degree of deterioration. The degree of deterioration is given in terms of a predetermined function. Accordingly, when ΔPi and ΔTq exceeding the preset threshold value SLPi and SLTq have been detected, an error is determined.

Further, the HC concentration sensor in FIG. 8(i) is installed on the exhaust pipe to detect the exhaust gas component. As discussed above, the air-fuel ratio sensor 33 may produce the output on the side of lean mixture even in the case of characteristic misfiring of the engine. Even if mixture is inadequate as a gas mixture, air-fuel ratio error is not detected when the ratio between air and fuel is not incorrect. Such a problem is found in the prior art. Further, the engine starts to rotate under its own power during the period of operation including startup cranking. This corresponds to the transient area characterized by a big change in combustion. Early detection of deterioration of the state of combustion is difficult, and diagnosis based on the air-fuel ratio may contain incorrect detection. Such problem is found out in the prior art. When HC concentration method is used, combustion is affected by gas mixture by detection of exhaust gas component, with the result that the state of combustion is changed. This allows quicker detection of a change in exhaust gas component than the air-fuel ratio sensor 32, thereby ensuring reliable evaluation of a problem in gas mixture. FIG. 10(i) shows the relationship between the degree of deterioration and evaluation value (SLHC) when the change in HC concentration is used for detection.

The sensor for detecting the exhaust gas component includes a NOx sensor (not illustrated). A problem of gas mixture can be evaluated by the change in concentration detected in the same manner. Further, when an exhaust gas temperature sensor (not illustrated) is mounted on the exhaust pipe, combustion is affected by gas mixture with the result that the state of combustion is subjected to change. Thus, change in exhaust gas temperature is detected and a problem in gas mixture can be evaluated.

FIG. 9 shows the case of FIG. 8 with an additional installation of (1) an auxiliary air passage 9 for bypassing the throttle valve 8, (2) an auxiliary air passage valve 10 for regulating the amount of air in the aforementioned auxiliary air passage 9, and (3) target speed control means for controlling the aforementioned auxiliary air passage valve 10 so that a predetermined target speed can be achieved, after the aforementioned internal combustion engine is determined to have started. Similarly to FIG. 9, each solid line indicates the behavior when the aforementioned gas mixture supply apparatus 21 has no performance problem, whereas each broken line indicates the behavior when there is some problem with the aforementioned gas mixture supply apparatus 21. If delay angle of ignition timing is corrected up to a predetermined level in the state of target speed control, there will be an increase in the amount of air to produce the required torque in order to maintain the speed, with the result that the amount of fuel is increased. In the present configuration, evaluation is made to determine that any one or more of the aforementioned upstream fuel injection valve 3, heater member 4, and auxiliary air passage valve 10 have a problem.

When the amount of air is as shown in FIG. 9(*j*), the engine speed is reduced below the target value, if there is any problem with the aforementioned gas mixture supply apparatus 21. So control is made in such a way as to increase the amount of air in the bypass such as auxiliary air passage valve (ISC valve) 10 to maintain the target speed, with the result that the amount of air is increased. Thus, means is provided to detect the change in the amount of air (Qa) within the time period preset in terms of tmm in a predetermined time tmd from the time when the delay angle of ignition timing is corrected upstream to a predetermined level as shown in 9(*e*). For example, an error of gas mixture supply apparatus 21 can be found out according to the magnitude of the maximum range of change ($\Delta$Qa). Assume that the maximum range of change on this tmm is $\Delta$Qa. There is a relation of $\Delta$Qa<$\Delta$Qa2 between the $\Delta$Qa1 detected when there is no performance problem and $\Delta$Qa2 detected when there is some performance problem. Thus, the magnitude of $\Delta$Qa is correlated with n error of the gas mixture supply apparatus 21, for example, with the degree of deterioration of the heater. FIG. 10(*j*) shows the relationship between the aforementioned $\Delta$Qa and the degree of deterioration. In this case, it is given in terms of a function of the aforementioned $\Delta$Qa. Thus, when $\Delta$Qa exceeding this value has been detected, it is determined as an error. Alternatively, it is also possible to obtain the degree of deterioration in a stepwise manner in conformity to $\Delta$Qa, and to determine an error when a predetermined degree of deterioration has been exceeded.

Further, it is also possible to use the following step: To detect the change in Qa, the amount of air in the bypass such as ISCv valve 10 is detected as an increase $\Delta$BA for tmm after the lapse of the aforementioned tmd wherein the amount of control prior to execution of correction of the delay angle in the aforementioned ignition time is used as a reference. An error evaluation value SLba is preset, and the degree of deterioration is obtained, accordingly.

Similarly, FIG. 10(*k*) shows the degree of deterioration when detection is made in terms of the change of fuel flowing into the cylinder $\Delta$qf in FIG. 9(*k*) and evaluation value (SLqf). It is also possible to detect qf according to the change in amount of fuel (g/min.) calculated by the control unit or in the time (ms) when the upstream fuel injection valve 3 is open.

When startup is made by the upstream fuel injection valve 3 as shown in the aforementioned FIG. 3, it may not be determined that the fuel supply means of the gas mixture supply apparatus 21 is normal even when the engine speed has reached a predetermined value. For example, when the degree of deterioration is small, the conditions on the aforementioned speed are satisfied. So in the next step, delay angle of ignition timing is corrected to reach the predetermined value, shown in the aforementioned FIG. 8(*e*), and the aforementioned range of change in engine speed is detected. When the preset degree of deterioration has been exceeded, an error is determined. When it has been determined that error evaluation has been confirmed, correction of the delay angle of ignition timing is stopped, and the fail-safe means to be described later is operated. Then control is made in such a way as to be switched to the fuel supply means by the aforementioned main fuel injection valve 2.

Figure 11:
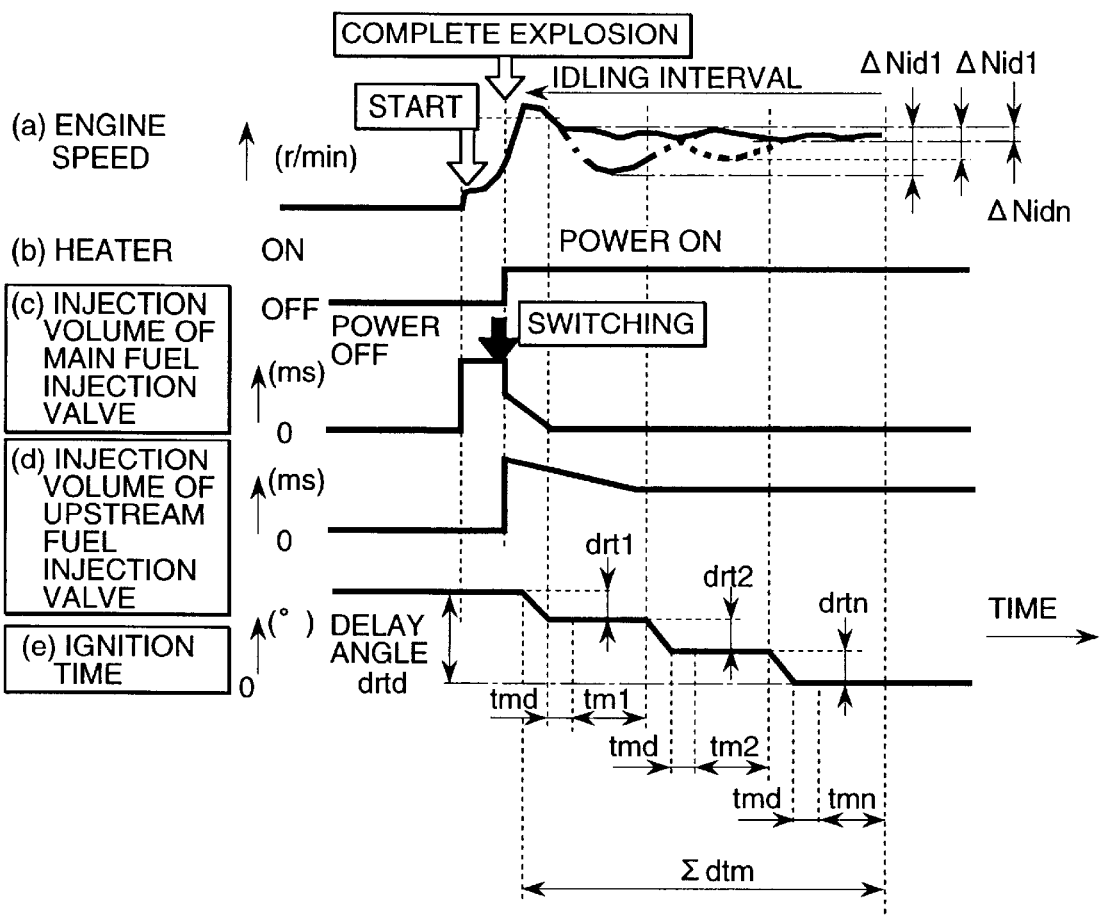
FIG. 11 is a drawing representing further details of a specific method for a gas mixture supply apparatus of a diagnostic apparatus for gas mixture supply apparatus according to the present embodiment.

FIG. 11 is a drawing showing further details of a specific method of the gas mixture supply apparatus error evaluation means 23. It shows an example of the case shown in FIG. 6.

In the aforementioned FIG. 6, after injection of the aforementioned upstream fuel injection valve 3 is started, delay angle of ignition timing shown i FIG. 6(*e*) is continued to be corrected to reach the predetermined level. In FIG. 11, by contrast, delay angle of ignition timing is carried out in several steps (n steps). A change in engine speed is detected in the steady mode during ignition timing to find out an error or the state of deterioration of the aforementioned gas mixture supply apparatus 21.

Figure 12:
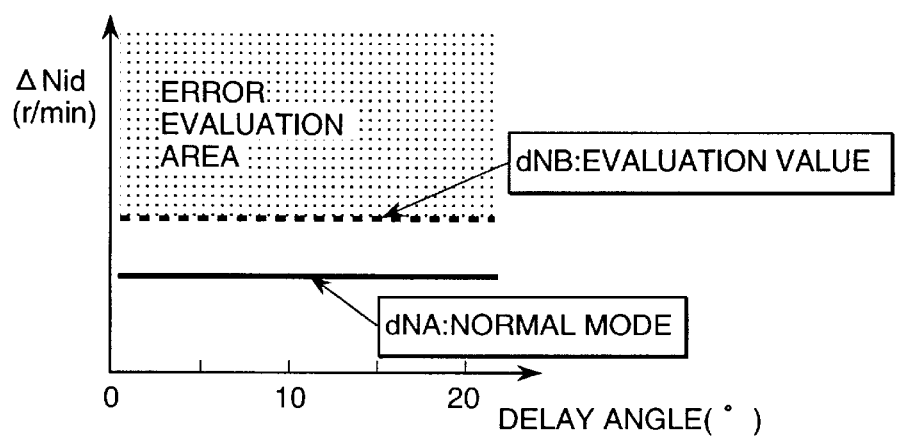
FIG. 12 is a drawing representing the maximum range of changes ΔNid and error evaluation value dNB in a diagnostic apparatus for gas mixture supply apparatus according to the present embodiment.

First, after the operation has been switched to the injection by the upstream fuel injection valve 3, the angle of ignition timing is delayed gradually to reach a predetermined level (drt1), and this state is maintained. Then it is possible to detects the maximum range of change in engine speed $\Delta$Nid1 within the time set on tm1 after the lapse of a predetermined time (tmd), FIG. 12 shows the maximum range of change $\Delta$Nid and error evaluation value dNB. FIG. 12 indicates the aforementioned maximum range of change $\Delta$Nid and the preset error evaluation value dN8. The dNB is set to a value with comfortable margin with respect to the maximum range of change $\Delta$NA with the normal scope. If Nid1<dNB to be detected within the scope of the aforementioned tm1, the aforementioned gas mixture supply apparatus 2 is considered to be free of an error, and the angle of ignition timing is continued to be gradually delayed to reach the preset value (drt2). The maximum range of change $\Delta$id2 of the engine speed within the time preset on tm3 after the lapse of a predetermined time (tdm) is detected.

If $\Delta$Nid2<dNB, the aforementioned gas mixture supply apparatus 21 is assumed to have no error, and the angle of ignition timing to reach a predetermined value (drtn) to be described later. Then that state is maintained. After the lapse of a predetermined time (tmd), the maximum range of change $\Delta$dn of the engine speed within the predetermined time set on the tmn is detected in the same way. The angle is delayed in several steps (n steps) until the finally required delay angle drtd is reached. If there is no change in speed where $\Delta$Nidn$\geq$dNB is reached Before the angle is delayed to reach the d4rdt, the aforementioned gas mixture supply apparatus 21 is evaluated as normal. If $\Delta$Nidn$\geq$dNB is found during the delay of the angle on the way, an error is determined. Further, if the total time $\Sigma$tm before reaching the required amount of delay angle for ignition timing is not as short as 20 seconds or less in actual execution, the effect of raising exhaust gas temperature will be reduced, and deterioration of exhaust gas will result, so it is necessary to select the proper number of steps (n sets) and the aforementioned times tmd and tmn. 'n' is preferred to be about 2 to three, and $\Sigma$dtm should be set to 5 to 10 seconds.

Figure 13:
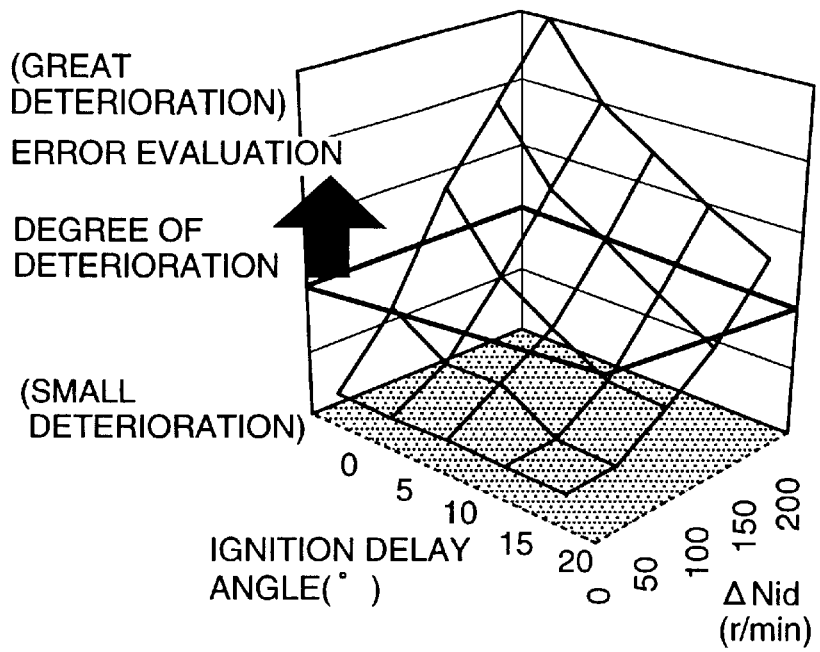
FIG. 13 is a drawing representing the delay angle, ΔNid and degree of deterioration in a diagnostic apparatus for gas mixture supply apparatus according to the present embodiment.

FIG. 13 is a map showing the delay angle $\Delta$Nid and the degree of deterioration. Only error evaluation is made in FIG. 12. By contrast, the degree of deterioration is preset in the form of a map from the relationship between delay angle and $\Delta$Nid with respect to $\Delta$Nidn in each stage in n-steps ignition timing in FIG. 11. In response, the state of deterioration of the aforementioned gas mixture supply apparatus 21 is evaluated in each stage. For example, setting is made in such a way that the degree of deterioration is large even when $\Delta$Nid detected when the delay angle is as small as 5 degrees is 100 r/min., and the degree of deterioration is small even when $\Delta$Nid detected when the delay angle is as large as 20 degrees is 100 r/min. Similarly to the case of the aforementioned FIG. 6, it is also possible obtain it by detecting a change in engine speed in terms of the magnitude of the maximum value of the change (ΔNm) in a predetermined time, in addition to ΔNid, or by detecting the magnitude of the deviation (dNmea) from the target engine speed.

In the diagnostic apparatus configured in the aforementioned manner, according to the method where the delay angle of ignition timing is gradually delayed to a predetermined level as shown in the aforementioned FIG. 6, when there is a large degree of deterioration of the upstream fuel injection valve 3 (e.g. severe deterioration, heater wire disconnection, extremely insufficiency of fuel supply), combustion will be deteriorated before angle delay is completed, possibly resulting in increase of the amount of discharged hydrocarbon or stalling of the engine in the worst case. By contrast, stepwise angle delay allows the degree of degradation to be evaluated while detecting the state of combustion with respect to the amount of delay angle. This eliminates the possibility of extreme increase in the amount of discharged hydrocarbon or engine stalling in the worst case.

Figure 14:
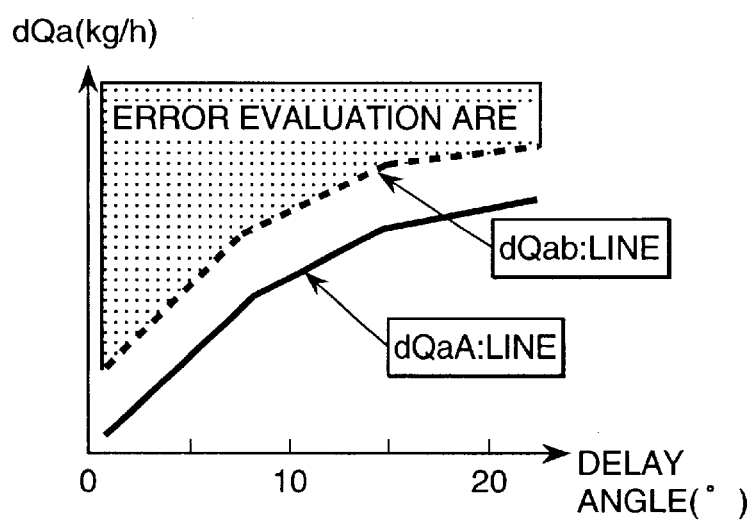
FIG. 14 is a drawing representing a method for evaluating an error in terms of air flow volume Qa in a diagnostic apparatus for gas mixture supply apparatus according to the present embodiment.

FIG. 14 is a drawing representing the method of evaluating an error in terms of air flow rate Qa.

As shown in FIG. 14, if the angle of ignition timing is delayed, control is made in such a way as to increase the amount of air. Thus, an error is determined if increase in the amount of air (dQa) in conformity to the delay angle of ignition timing ha exceeded the evaluation value line (dQaB which is preset as a table value or function with respect to the amount of ignition angle with comfortable margin, for the line dQaA obtained at the normal time.

According to the same concept as the error evaluation method described with reference to FIGS. 12 to 14, similarly to the case of FIG. 8 (not illustrated), an error or degree of deterioration can be evaluated even when setting an error line in response to the amount of change in the intake manifold ΔPm as another gas mixture state detecting means in response to the delay angle for ignition timing, or when setting an error evaluation line in response to the change in the amount of fuel flowing into the cylinder Δqf.

Figure 15:
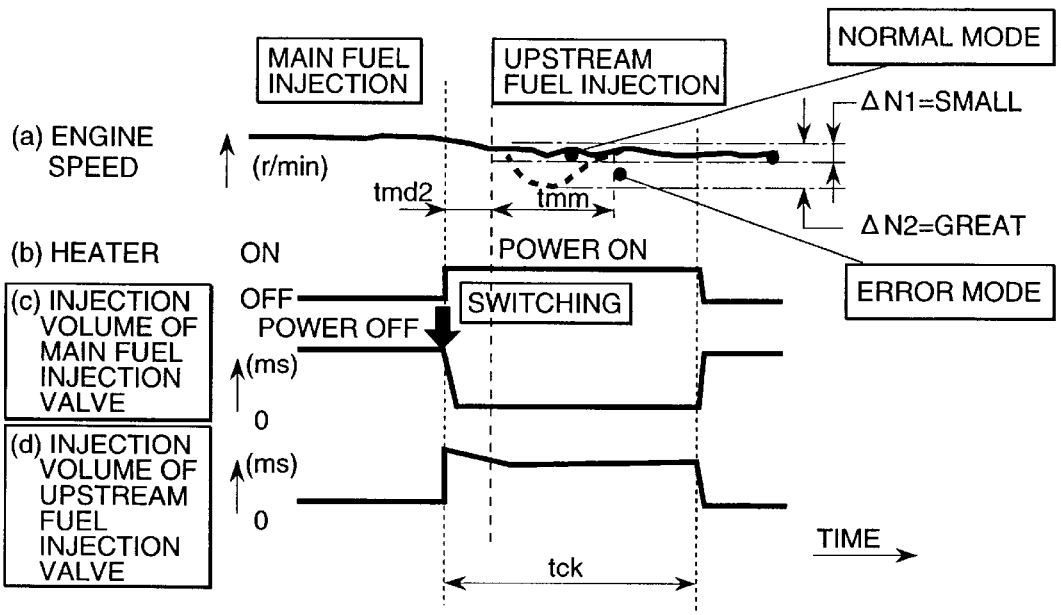
FIG. 15 is a drawing representing a method for evaluating an error of a gas mixture supply apparatus in the normal operating state in terms of air flow volume Qa in a diagnostic apparatus for gas mixture supply apparatus according to the present embodiment.
Figure 16:
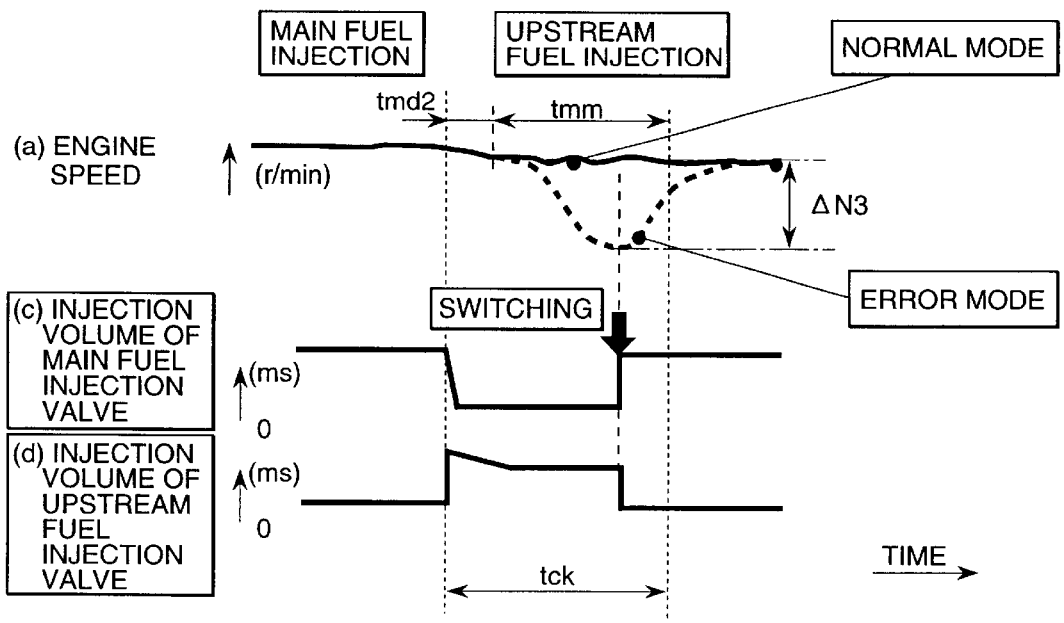
FIG. 16 is a drawing representing a method for evaluating an error of a gas mixture supply apparatus in the normal operating state in terms of air flow volume Qa in a diagnostic apparatus for gas mixture supply apparatus according to the present embodiment.
Figure 17:
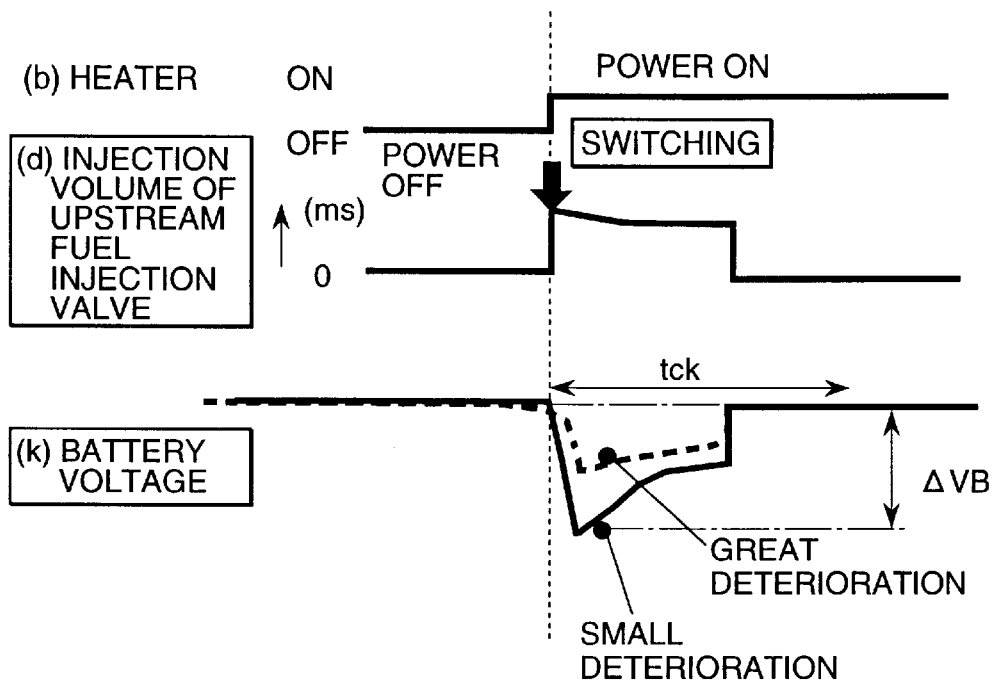
FIG. 17 is a drawing representing a method for evaluating an error of a gas mixture supply apparatus in the normal operating state in terms of a change of battery voltage in a diagnostic apparatus for gas mixture supply apparatus according to the present embodiment.

With reference to FIGS. 15 to 17, the following will describer the method of the evaluating an error or deterioration of the aforementioned gas mixture supply apparatus 21 under normal operating condition in addition to the condition immediately after startup.

FIGS. 15 and 16 show how to evaluate an error of a mixture supply apparatus under the normal operating conditions.

In FIG. 15, a switching device is provided to perform forcible switching from independent operation by the main fuel injection valve 2 under the normal condition to the independent operation by the upstream fuel injection valve 3. This switching device is installed in the area where maneuverability is less affected, for example, in the high-sped and high-load area. The injection valve is switched on the assumption that no error is determined during the operation independently by the main fuel injection valve 2. After the injection valve has been switched, similarly to the case shown in FIG. 6, an error of the gas mixture supply apparatus 21 is evaluated in terms of the magnitude of the maximum range of change in the engine speed in conformity to the maximum range of change ΔN in engine speed within a predetermined time to be set on tmm after a predetermined tmd2. After the lapse of time tck subsequent to switching, the independent operation by the main fuel injection valve 2 is resumed. However, if there is a change resulting in ΔN>ΔN3 as shown in FIG. 6, the operation returns to the independent operation by the main fuel injection valve 2 even before the lapse of time tck. If a serious error is found out, sale-safe means is utilized.

FIG. 17 is a drawing representing how to evaluate an error of a gas mixture supply apparatus according to the change in battery voltage. It shows a method for evaluating an error or deterioration of the aforementioned gas mixture supply apparatus 2 according to the change in battery voltage (VB) when the independent operation by the main fuel injection valve 2 is switched over to the independent operation by the upstream fuel injection valve 3, as shown in FIGS. 6, 8, 15 and 16.

When the operation mode is switched, the heater changes from off-state (power off) to on-state (power on). This results in consumption of heater current and reduction in battery voltage (VB). The heater current reaches the maximum value when the heater is turned on. An error or E6392Adeterioration can be evaluated by detecting the maximum range of change (ΔVB) when the heater is turned on, or the maximum percentage of the change (dvb). If there is no deterioration there is a large inrush current when the heater is turned on, and the range of change in VB tends to increase.

Figure 18:
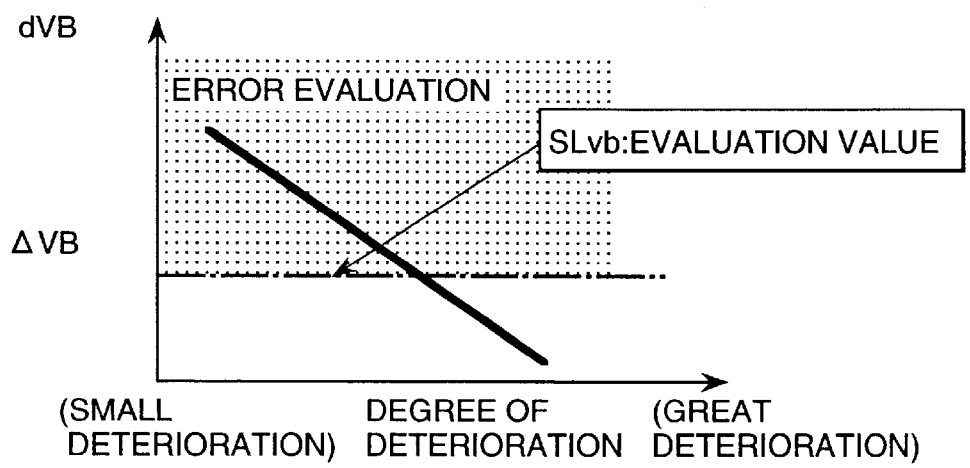
FIG. 18 is a drawing representing the relationship between a change in battery voltage and degree of deterioration in a diagnostic apparatus for gas mixture supply apparatus according to the present embodiment.

FIG. 18 is a drawing representing the change in battery voltage and degree of deterioration.

The aforementioned ΔVB and degree of deterioration are approximately inversely proportional to each other. The degree of deterioration is given in terms of the function of ΔVB. Thus, an error is determined when ΔVB not exceeding a predetermined value SLvb has been detected. It should be noted, however, in this case that the value ΔVB is detected as a large value when the battery itself is deteriorated or is not sufficiently charged. So even if the heater is deteriorated, an error is not determined in some cases. Thus, when the heater is off, the battery VB is 12 volts or more when the engine is stopped, and is about 14 volts when an alternator is generating power. In this case, the battery is evaluated as normal. Based on this assumption, evaluation is made according to the change in battery voltage (VB). This is an important point.

Figure 19:
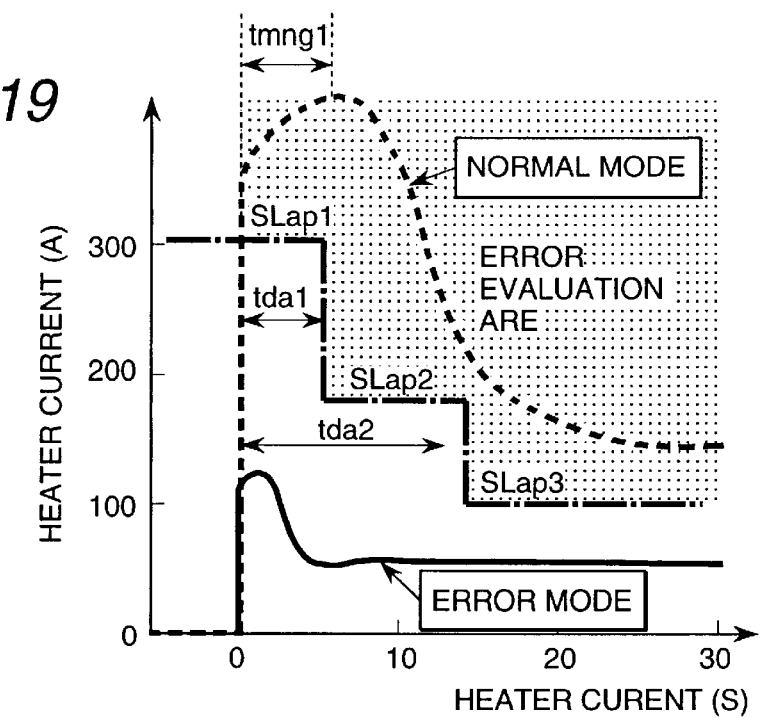
FIG. 19 is a drawing representing the relationship between heater current and heat-on time in a diagnostic apparatus for gas mixture supply apparatus according to the present embodiment.

FIG. 19 is a drawing representing the relationship between heater current and the time when the heater is tuned on. It shows the configuration in FIG. 2 wherein an error or deterioration of the aforementioned gas mixture supply apparatus 21 is determined when a heater current detecting means 20 is provided.

Assume that the horizontal axis indicates the time elapsed for switching from the off-state of the heater to the on-state. When there is no error, the heater current value to be detected takes a value below a predetermined value, e.g. a value below 200A, where the maximum value appears immediately after power is turned on. So in the present embodiment, current evaluation values SLap1, SLap2 and SLap3 are set in three stages of tdal, tdal2 and tdal3 respectively according to the passage of time. If the predetermined time has been exceeded in each stage, an error is determined. Here the evaluation value can be one SLap1 value aiming at the maximum value, or more than three stages can be used. When obtained from the change in heater current, two or three stages are preferable. The current value changes with the amount of fuel attached to the heater due to the amount of injected fuel. So evaluation accuracy will be improved and incorrect diagnosis will be prevented if evaluation values SLap1, SLap2 and SLap3 are set according to the amount of injected fuel in advance.

Figure 20:
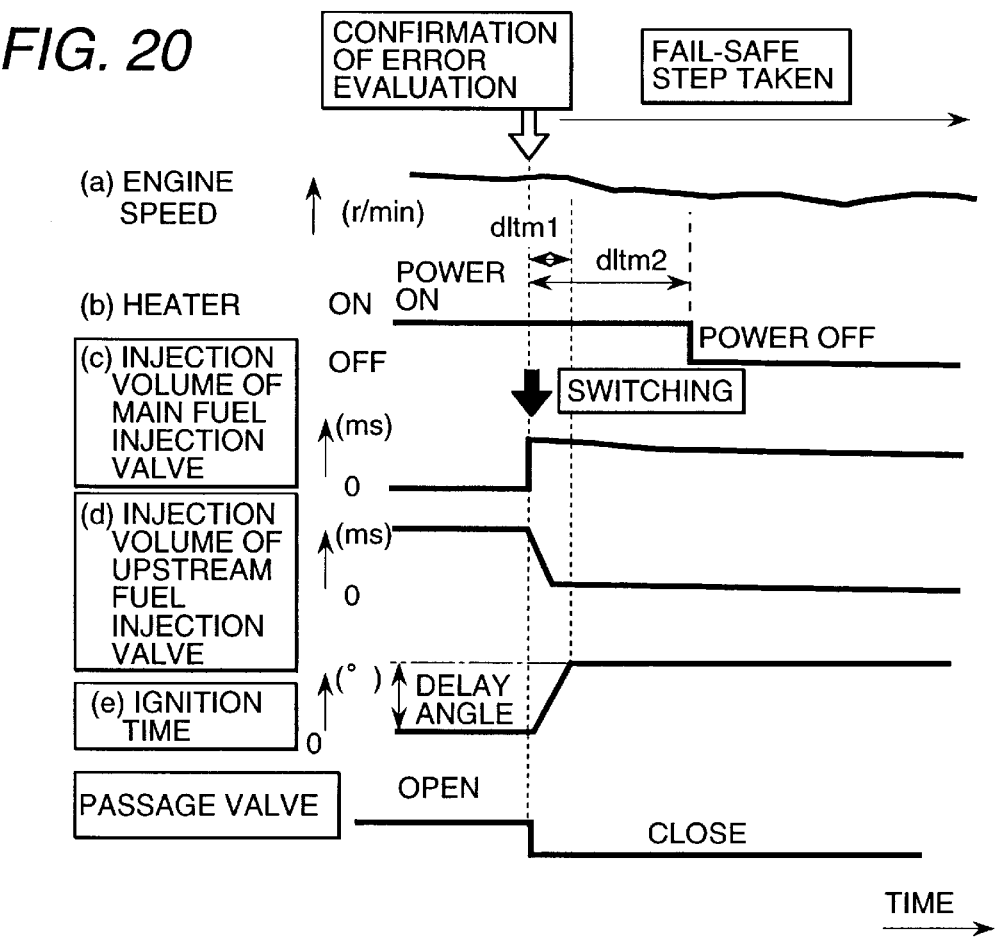
FIG. 20 is a drawing representing fail-safe method when deterioration has been determined in a diagnostic apparatus for gas mixture supply apparatus according to the present embodiment.

FIG. 20 is a drawing representing a fail-safe method for deterioration evaluation. It shows a fail-safe method when an error or deterioration has been evaluated according to the method for evaluating the aforementioned gas mixture supply apparatus 21. At least, it shows the method for ensuring engine startup, continued operation of the engine and prevention of exhaust gas from being deteriorated.

As shown in FIG. 20(d), when operation is performed by upstream fuel injection valve 3 alone or by the fuel supply means for setting a greater share of fuel supply by gas mixture supply apparatus 21 alone, and when it has been determined that error evaluation is confirmed, then delay of ignition timing angle for promoting activation of the catalyst shown in FIG. 20(e) is stopped. After the ignition timing is controlled to reduce the shock due to switching of the fuel supply means, ignition time is controlled so as to stop delay of angle. Control is made in such a way as to switch from the aforementioned main fuel injection valve 2 alone shown in 20(c) or the aforementioned gas mixture supply apparatus 21 to the fuel supply means for setting greater share of fuel supply for the main fuel injection valve 2. In some cases, the power supplied to the heater shown in FIG. 20(b) should be turned off after evaporating the fuel injected by the upstream fuel injection valve 3. But in other cases, it should be turned off when the aforementioned heater has been evaluated as containing an error. So the time from confirmation of error evaluation to turning off of the heater (d1tn2) is set in order to ensure that the time of turning it off can be selected depending on the result of error evaluation, The embodiment of the diagnostic apparatus described so far is based on the understanding that the fuel injection valve provided close to the suction port is the main injection valve 2. It is also possible to use the injection valve for direct injection of fuel into the combustion chamber as the main fuel injection valve. There is no difference in the method of diagnosis and the advantages derived therefrom.

Figure 21:
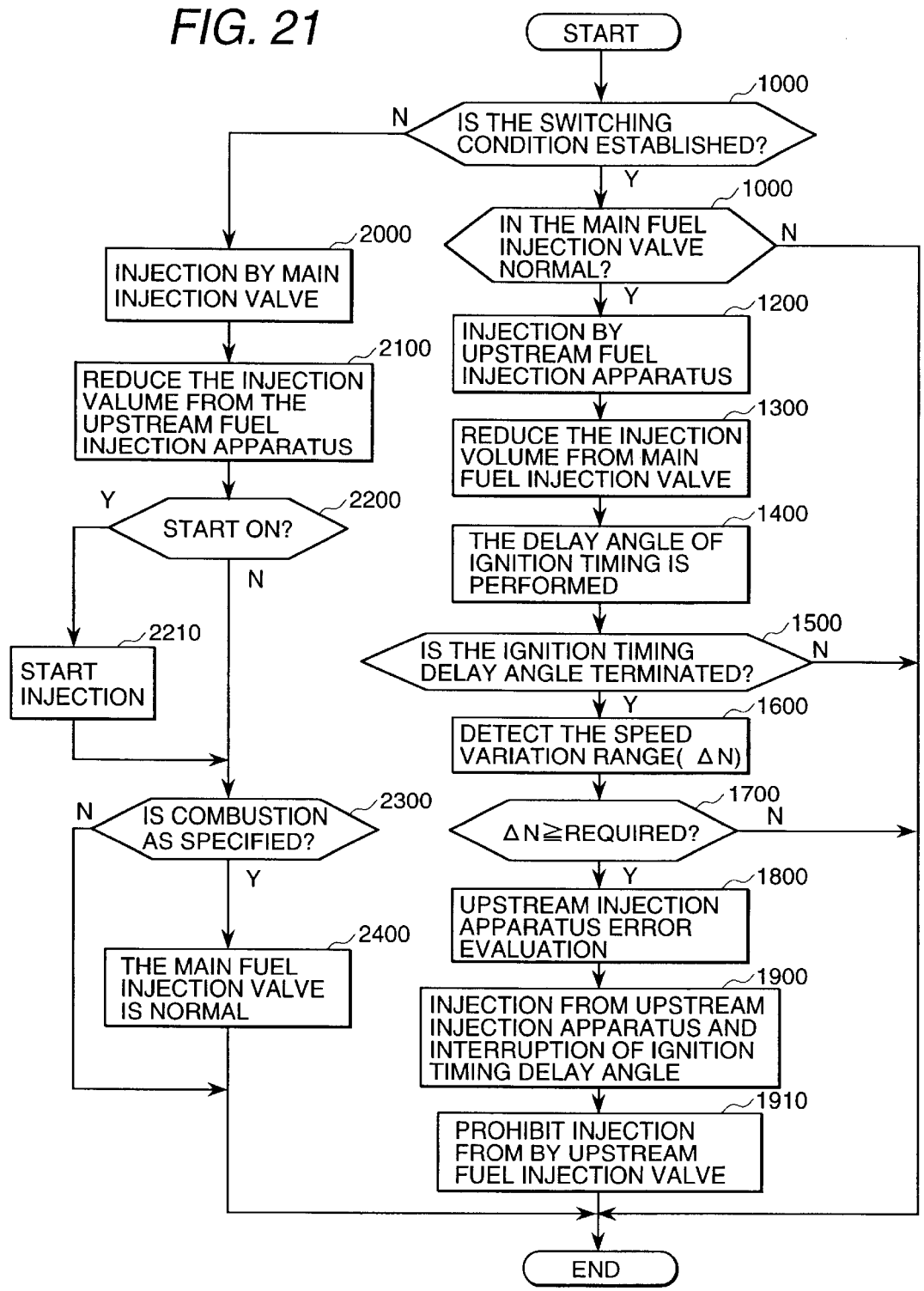
FIG. 21 is a flow chart representing an error evaluation step of a gas mixture supply apparatus in a diagnostic apparatus for gas mixture supply apparatus according to the present embodiment.

The following describes the error evaluation control for the gas mixture supply apparatus 21 in the aforementioned embodiment:

FIG. 21 is a flow chart showing error evaluation for the gas mixture supply apparatus 21. In the computation apparatus (MPU) of the control unit 19, startup is executed by the main routine (not illustrated) at every predetermined time interval.

In step 1000, the fuel supply means switching means checks if injection is performed by the gas mixture supply apparatus 21 or main fuel injection valve 2. When the switching condition has been established and injection by gas mixture supply apparatus 21 is determined, control goes to step 1000. If injection by main fuel injection valve 2 is determined, control goes to step 2000.

In step 2000, injection by main fuel injection valve 2 is performed. In step 2100, the amount of injection by the gas mixture supply apparatus 21 is reduced if injection by gas mixture supply apparatus 21 has been performed in the previous routine. Then in Step 2200, check is made to see if the starter is turned on or not. If the starter is off, control goes to step 2300. If the starter is evaluated as turned on in step 2200, setting is so made in step that injection at the startup can be executed. Then control goes to step 2300.

In step 2300, check is made to see if a predetermined state of combustion has been reached or not. If the predetermined state has been reached—e.g. engine speed has reached 800 r/min.—, then the main fuel injection valve 2 is evaluated as normal in step 2400. If the predetermined state of combustion is not reached, the routine is terminated immediately.

When injected by the gas mixture supply apparatus 21 is determined in step 1000 and control has proceeded to step 1100, check is made in step 1100 to see if the main fuel injection valve 2 is normal or not. If the main fuel injection valve 2 is not evaluated as normal in step 1100, then the routine terminates immediately. If the main fuel injection valve 2 is evaluated as normal, control goes to step 1200.

In step 1300, injection by the gas mixture supply apparatus 21 is performed, and such control as turning on the heater (not illustrated) is carried out at the same time. Then in step 1300, injection of the main fuel injection valve 2 is stopped or the volume of injection is gradually reduced to a value close to zero.

In step 1400, delay angle of ignition timing is corrected, and check is made to see if delay angle has been corrected to the predetermined value in step 1500 or not. If the predetermined value is not reached, the current routine is terminated immediately, and this routine driven at every predetermined time interval is repeated until it is reached.

When the delay angle has been correct ed to the predetermined level, the range of the change in speed (ΔN) is calculated in step 1600. This calculation in step 1600 is detected as the amount of change per unit time (e.g. 40 ms) during the predetermined time which is measured from the time when the aforementioned delay angle has been corrected to the predetermined level.

In step 1700, check is made to see if the value of the aforementioned ΔN is greater than the preset value or not. If this predetermined value is not reached, this routine is terminated immediately. This routine driven at every predetermined time interval is repeated. If this value has never been reached within the specified time, the upstream injection valve is evaluated as normal by another routine (not illustrated).

When the predetermined has been reached in step 1700, an error of the gas mixture supply apparatus 21 is evaluated in step 1800, and the predetermined evaluation result flag is set. In step 1900, action is taken to interrupt the injection of the gas mixture supply apparatus 21, correction of delay angle for ignition timing and application of power to the heater. In step 1910, action is further taken to disable injection of the gas mixture supply apparatus 21 and correction of delay angle for ignition timing.

The above description has dealt with the gas mixture state detecting means mainly for detecting the state of gas mixture and the evaluation means for evaluation an error of the gas mixturer supply means. This means provides a method for diagnosing gas mixture supply apparatus 21 for determining that the gas mixture supply apparatus 21 has problem.

In addition to the aforementioned method of evaporation by an electric heater for applying power to the heater member, evaporation can be made by any of the following methods; heater evaporation based on combustion heat, evaporation by ultrasonic vibration, evaporation by hot water and evaporation by exhaust gas temperature. They can be used except for the examples given in FIGS. 17 to 19.

As described above, a diagnostic apparatus for gas mixture supply apparatus and diagnostic method thereof in the present embodiment is characterized in that;

in a gas mixture supply apparatus of an internal combustion engine comprising;

a main fuel injection valve 2 for supplying fuel to an internal combustion engine, an upstream fuel injection valve 3 for supplying fuel to the area upstream from the main fuel injection valve 2, and gas mixture supply means for supplying gas mixture from upstream of the main fuel injection valve 2 through an evaporation means for evaporating all or part of fuel supplied from the upstream fuel injection valve 3;

a diagnostic apparatus for the gas mixture supply apparatus further comprising;

error evaluation means for detecting the state of gas mixture being supplied, based on the result of detection such as the amount of change in engine speed and for evaluating an error of the gas mixture supply means based on the result of detection such as the amount of change, fail-safe control means containing;

a step of stopping the fuel supplied from upstream fuel injection valve 3 when an error has been determined, and a step of switching to the main fuel injection valve 2, stopping of the evaporation means and correction of ignition timing immediately or in a stepwise manner.

Thus, even if an error has occurred to the gas mixture supply apparatus 21 and a sufficient amount of fuel cannot be supplied, the present invention ensures engine startup, permits continued operation of the engine without a problem which may cause stalling of the engine, and prevents deterioration of exhaust gas. This eliminates the following possible troubles which may occur when a sufficient amount of evaporated fuel cannot be supplied from the gas mixture supply apparatus due to an error of the gas mixture supply means; failure in effective use of the advantage of combustion improvement, increase in the amount of emitted hydrocarbon and stalling of the engine due to combustion failure in the worst case.

The above description has dealt with one embodiment of the present invention. It should be apparent however, that various design modifications of the present invention are possible without the present invention being restricted only to the aforementioned embodiments or without departing from the spirit of the present invention as set forth in the claims.

As is apparent from the above description, a diagnostic apparatus for gas mixture supply apparatus and diagnostic method thereof according to the present invention provides a gas mixture supply apparatus characterized in that, when any trouble has occurred to a gas mixture supply apparatus, it can be identified as an error; and at least engine startup can be ensured, continued operation of the engine is enabled without any problem which may cause stalling of the engine, and deterioration of exhaust gas can be prevented.

What is claimed:

1. In a gas mixture supply apparatus of an internal combustion engine, comprising;

a main fuel injection valve for supplying fuel to the internal combustion engine, an upstream fuel injection valve for supplying fuel to the area upstream from said main fuel injection valve, and gas mixture supply which supplies a gas mixture from upstream of said main fuel injection valve through an evaporator which evaporates all or part of fuel supplied from said upstream fuel injection valve;

a diagnostic apparatus for said gas mixture supply apparatus comprising;

a gas mixture state detector which detects the state of gas mixture when gas mixture is supplied from said gas mixture supply with said evaporator operating, and evaluation apparatus which evaluates an error of said gas mixture supply based on the result of detecting said gas mixture state detector.

2. In a gas mixture supply apparatus according to claim 1, further comprising main fuel supply evaluation apparatus configured to inject fuel through said main fuel injection valve at least during start cranking, and evaluate fuel supply as being normal through said main injection valve when engine speed has exceeded a predetermined level or intake manifold pressure has been reduced below a predetermined level; and a fuel supply change apparatus configured to reduce the amount of fuel or stopping the supply of fuel in response to the evaluation made by said main fuel supply evaluation apparatus as being normal, increase the amount of fuel supplied from said upstream fuel injection valve or switching to said upstream fuel injection valve, and actuate said evaporator.

3. In a gas mixture supply apparatus according to claim 1, further comprising error storage means for storing an error when such an error has been found out by said evaluation apparatus, and/or error alarm means for issuing an error alarm.

4. In a gas mixture supply apparatus according to claim 1, wherein said evaporator is arranged to perform at least one of evaporation by an electric heater, heater evaporation by combustion, evaporation by ultrasonic vibration, evaporation by hot water and evaporation by exhaust gas temperature.

5. In a gas mixture supply apparatus according to claim 1, wherein said gas mixture state detector is configured to detect the state of gas mixture based on the result of detecting at least one of engine speed, intake manifold pressure, combustion pressure, torque value, exhaust temperature, HC concentration, NOx concentration and CO concentration.

6. In a gas mixture supply apparatus according to claim 5, further comprising error storage means for storing an error when such an error has been found out by said evaluation apparatus, and/or error alarm means for issuing an error alarm.

7. In a gas mixture supply apparatus according to claim 1, wherein said evaluation apparatus is configured to make an evaluation based on at least one of the absolute value of the result of detecting, with said gas mixture state detector, the amount and rate of change, deviation from a predetermined target value and fluctuating surge.

8. In a gas mixture supply apparatus according to claim 7, wherein said gas mixture state detector is configured to detect the state of gas mixture based on the result of detecting at least one of engine speed, intake manifold pressure, combustion pressure, torque value, exhaust temperature, HC concentration, NOx concentration and CO concentration.

9. In a gas mixture supply apparatus according to claim 1, further comprising a fail-safe control configured to reduce the amount of fuel or stopping the supply of fuel in response to the evaluation made by said evaluation apparatus as containing an error, increase the amount of fuel supplied from said main fuel injection valve or switching to said main fuel injection valve, stop said evaporator, and correct ignition timing;

wherein said fail-safe control is arranged to reduce deterioration of the state of said internal combustion engine operation and/or increase in the amount of hazardous exhaust gas.

10. In a gas mixture supply apparatus according to claim 9, wherein said evaporator is arranged to perform at least one of evaporation by an electric heater, heater evaporation by combustion, evaporation by ultrasonic vibration, evaporation by hot water and evaporation by exhaust gas temperature.

11. In a gas mixture supply apparatus according to claim 1, further comprising an auxiliary air passage for bypassing a throttle valve, an auxiliary air passage valve for regulating the amount of air in said auxiliary air passage, a target speed control configured to control said auxiliary air passage valve to reach a predetermined target speed after said internal combustion engine has started and has been evaluated, an ignition timing control configured to control ignition timing to be on the side of delay angle at least when fuel is supplied from said upstream fuel injection valve, and evaluation apparatus for evaluating at least one error in said upstream fuel injection valve, said evaporator and said auxiliary air passage valve, based on the result of detection by said gas mixture state detector when said ignition timing is controlled to be on the side of delay angle.

12. In a gas mixture supply apparatus according to claim 11, wherein said ignition timing control is configured to control ignition timing in terms of delay angle in a predetermined number of times.

13. In a gas mixture supply apparatus according to claim 11, wherein said gas mixture state detector is configured to detect the state of gas mixture based on the result of detecting one or more of the amounts of sucked air, auxiliary air passage valve control and fuel injection.

14. In a gas mixture supply apparatus according to claim 11, further comprising a fail-safe control configured to reduce the amount of fuel or stopping the supply of fuel in response to the evaluation made by said evaluation apparatus as containing an error, increase the amount of fuel supplied from said main fuel injection valve or switching to said main fuel injection valve, stop said evaporator, and correct ignition timing;

wherein said fail-safe control is arranged to reduce deterioration of the state of said internal combustion engine operation and/or increase in the amount of hazardous exhaust gas.

15. In a gas mixture supply apparatus for a gas mixture supply apparatus according to claim 11, further comprising main fuel supply evaluation apparatus configured to inject fuel through said main fuel injection valve at least during start cranking, and evaluate fuel supply as being normal through said main injection valve when engine speed has exceeded a predetermined level or intake manifold pressure has been reduced below a predetermined level; and a fuel supply change apparatus configured to reduce the amount of fuel or stopping the supply of fuel in response to the evaluation made by said main fuel supply evaluation apparatus as being normal, increase the amount of fuel supplied from said upstream fuel injection valve or switching to said upstream fuel injection valve, and actuate said evaporator.

16. In a gas mixture supply apparatus according to claim 1, further comprising means for evaluating the deterioration of battery, and means for evaluating said gas mixture supply for an error based on the result of detecting battery voltage when fuel is supplied from said upstream fuel valve after evaluation is made to determine that a battery is not deteriorated.

17. In a gas mixture supply apparatus according to claim 16, further comprising error storage means for storing an error when such an error has been found out by said evaluation apparatus, and/or error alarm means for issuing an error alarm.

18. In a gas mixture supply apparatus of an internal combustion engine for supplying gas mixture from the area upstream of said main fuel injection valve comprising a main fuel injection valve for supplying fuel to an the internal combustion engine, an upstream fuel injection valve for supplying fuel to the an area upstream from said main fuel injection valve, a heater member for heating all or part of fuel supplied from said upstream fuel injection valve and evaporating the fuel, a heater control to control application of electric power to said heater member;

a diagnostic apparatus for a gas mixture supply apparatus including a gas mixture state detector to detect the state of gas mixture formed when fuel is supplied from said upstream fuel injection valve with electric power applied to said heater member by said heater control, and evaluation apparatus to evaluate an error of said upstream fuel injection valve and/or said heater member based on the result of detecting said gas mixture state detector.

19. In a gas mixture supply apparatus according to claim 18, further comprising fail-safe control configured to reduce the amount of fuel or stopping the supply of fuel in response to the evaluation made by said evaluation apparatus as containing an error, increase the amount of fuel supplied from said main fuel injection valve or switching to said main fuel injection valve, stop application of electric power to said heater member, and correct ignition timing;

wherein said fail-safe control is arranged to reduce deterioration of the state of said internal combustion engine operation and/or increase in the amount of hazardous exhaust gas.

20. In a gas mixture supply apparatus according to claim 18, further comprising a main fuel supply evaluation apparatus configured to inject fuel through said main fuel injection valve at least during start cranking, and evaluate fuel supply as being normal through said main injection valve when engine speed has exceeded a predetermined level or intake manifold pressure has been reduced below a predetermined level; and a fuel supply change apparatus configured to reduce the amount of fuel or stopping the supply of fuel in response to the evaluation made by said main fuel supply evaluation apparatus as being normal, increase the amount of fuel supplied from said upstream fuel injection valve or switching to said upstream fuel injection valve, and apply electric power to said heater member.

21. In a gas mixture supply apparatus according to claim 18, wherein said gas mixture state detector is arranged to detect the state of gas mixture based on
   the result of detection by
   a heater current detector arranged to detect the current applied to said heater member, and
   said heater current detector subsequent to electric power to said heater member having been applied to said heater member, and
   the trouble setup value of a heater current to be set in conformity to the amount of fuel injection in advance.

22. In a gas mixture supply apparatus according to claim 18, wherein said gas mixture state detector is configured to detect the state of gas mixture based on the result of detecting at least one of engine speed, intake manifold pressure, combustion pressure, torque value, exhaust temperature, HC concentration, NOx concentration and CO concentration.

23. In a gas mixture supply apparatus according to claim 18, further comprising
   an auxiliary air passage for bypassing a throttle valve,
   an auxiliary air passage valve for regulating the amount of air in said auxiliary air passage,
   a target speed control configured to control said auxiliary air passage valve to reach a predetermined target speed after said internal combustion engine has started and has been evaluated,
   an ignition timing control configured to control ignition timing to be on the side of delay angle at least when fuel is supplied from said upstream fuel injection valve,
   evaluation apparatus configured to evaluate one or more errors in said upstream fuel injection valve, said heater member and said auxiliary air passage valve, based on the result of detection by said gas mixture state detector when said ignition timing is controlled to be on the side of delay angle.

24. In a gas mixture supply apparatus according to claim 23, further comprising
   fail-safe control configured to reduce the amount of fuel or stopping the supply of fuel in response to the evaluation made by said evaluation apparatus as containing an error,
   increase the amount of fuel supplied from said main fuel injection valve or switching to said main fuel injection valve,
   stop application of electric power to said heater member, and
   correct ignition timing;
   wherein said fail-safe control is arranged to reduce deterioration of the state of said internal combustion engine operation and/or increase in the amount of hazardous exhaust gas.

25. In a gas mixture supply apparatus according to claim 23, further comprising
   a main fuel supply evaluation apparatus configured to inject fuel through said main fuel injection valve at least during start cranking, and
   evaluate fuel supply as being normal through said main injection valve when engine speed has exceeded a predetermined level or intake manifold pressure has been reduced below a predetermined level; and
   a fuel supply change apparatus configured to reduce the amount of fuel or stopping the supply of fuel in response to the evaluation made by said main fuel supply evaluation apparatus as being normal,
   increase the amount of fuel supplied from said upstream fuel injection valve or switching to said upstream fuel injection valve, and
   apply electric power to said heater member.

26. In a gas mixture supply apparatus according to claim 23, wherein said ignition timing control is configured to control ignition timing in terms of delay angle in a predetermined number of times.

27. In a gas mixture supply apparatus according to claim 23, wherein said gas mixture state detector is configured to detect the state of gas mixture based on the result of detecting one or more of the amounts of sucked air, auxiliary air passage valve control and fuel injection.

28. A diagnostic method for gas mixture supply apparatus of an internal combustion engine comprising
   a main fuel injection valve for supplying fuel to the internal combustion engine,
   an upstream fuel injection valve for supplying fuel to an area upstream from said main fuel injection valve, and
   gas mixture supply configured to supply gas mixture from upstream of said main fuel injection valve through an evaporator for evaporating all or part of fuel supplied from said upstream fuel injection valve; said diagnostic method, comprising
   detecting the state of gas mixture when gas mixture is supplied from said gas mixture supply with said evaporator operating, and
   evaluating an error of said gas mixture supply based on said detected state.

* * * * *